US006906503B2

(12) United States Patent
Lopez-Santillana et al.

(10) Patent No.: US 6,906,503 B2
(45) Date of Patent: Jun. 14, 2005

(54) POWER SUPPLY CONTROLLER FOR EXERCISE EQUIPMENT DRIVE MOTOR

(75) Inventors: Juan-Luis Lopez-Santillana, Edmonds, WA (US); Laurentiu Olariu, Bellevue, WA (US); Robert Michael Prothero, Mill Creek, WA (US); Lewis V. Hughes, Snohomish, WA (US); Hoang Le-Huy, Saint-Augustin-de-Desmaures (CA)

(73) Assignee: Precor Incorporated, Woodinville, WA (US)

( * ) Notice: Subject to any disclaimer, the term of this patent is extended or adjusted under 35 U.S.C. 154(b) by 43 days.

(21) Appl. No.: 10/354,935

(22) Filed: Jan. 27, 2003

(65) Prior Publication Data

US 2004/0047166 A1 Mar. 11, 2004

Related U.S. Application Data

(60) Provisional application No. 60/351,961, filed on Jan. 25, 2002.

(51) Int. Cl.[7] .............................. G05F 1/40; G05F 1/10
(52) U.S. Cl. ....................................... 323/283; 323/222
(58) Field of Search ................................ 323/222, 223, 323/226, 273, 282, 283, 285; 363/52, 53, 81, 82, 84, 89, 125, 127

(56) References Cited

U.S. PATENT DOCUMENTS

| 5,475,296 A | * | 12/1995 | Vinsant et al. ............... 323/223 |
| 5,627,445 A | * | 5/1997 | Webster ...................... 318/701 |
| 6,324,042 B1 | * | 11/2001 | Andrews .................... 361/93.2 |
| 6,703,808 B1 | * | 3/2004 | Blackburn et al. .......... 318/701 |

OTHER PUBLICATIONS

Chew, M.H., "Design of Power Factor Correction Circuit Using GreenLine™ Compact Power Factor Controller MC33260," ON Semiconductor, <http://onsemi.com> Publ. Order No. AND8016/D, Jun. 2002—Rev. 1, pp. 1–12.

Graf, R.F., "Zero Crossing Detectors," *The Encyclopedia of Electronic Circuits*, TAB Publishing Co., 1985, pp. 727–729.

"GreenLine™ Compact Power Factor Controller: Innovative Circuit for Cost Effective Solutions," *ON Semiconductor*, <http://onsemi.com> Publ. Order No. MC33260/D, Sep. 2002—Rev. 5, pp. 1–24.

"High Voltage GreenLine™ Power Factor Controller," *ON Semiconductor*, <http://onsemi.com> Publ. Order No. MC33368/D, Sep. 2002—Rev. 6, pp. 1–20.

Noon, J.P., "Designing High–Power Factor Off–Line Power Supplies," *Texas Instruments, 2002 Power Supply Design Seminar (SEMINAR 1500)*, pp. 2–1–2–3.

Pippinger, D., and E.J. Tobaben, "Comparator Considerations and Applications/Texas Instruments," *PCIM Magazine*, Feb. 1989, p. 61.

* cited by examiner

*Primary Examiner*—Matthew V. Nguyen
(74) *Attorney, Agent, or Firm*—Christensen O'Connor; Terence P. O'Brien; Paul Schaafsma

(57) ABSTRACT

A combined power supply and driver control module includes rectifier circuitry, switching circuitry, and driver circuitry for providing output power to a load. Rectified output from an input power source is used to produce a DC power. The switching circuitry receives the DC power and modulates the input current drawn from the power source. An intelligent control module includes control circuitry, such as a digital processor, for controlling the switching circuitry. Power factor is improved by modulating the input current to be closer in phase with the voltage of the power source. Also disclosed is a power factor correction circuit in which a digital processor reads waveform values from a lookup table and modulates the input current waveform based on the values. A zero crossing detector connected to the input power source may direct the digital processor when to commence reading values from the lookup table.

40 Claims, 14 Drawing Sheets

LOOK UP TABLE

| |
|---|
| *0.0000* |
| *0.0244* |
| *0.0488* |
| *0.0732* |
| *0.0976* |
| *0.1219* |
| ⋮ |
| *1.0000* |
| ⋮ |
| *0.1219* |
| *0.0976* |
| *0.0732* |
| *0.0488* |
| *0.0244* |
| *0.0000* |

*Fig.5.*

POWER SUPPLY CONTROLLER FOR EXERCISE EQUIPMENT DRIVE MOTOR

CROSS-REFERENCE TO RELATED APPLICATION

This application claims the benefit of the filing date of U.S. Provisional Patent Application No. 60/351,961, filed Jan. 25, 2002.

FIELD OF THE INVENTION

The present invention is directed to a controller for a power supply that provides electrical power to a load, such as a motor, and more particularly, to a power supply controller with power factor correction features.

BACKGROUND OF THE INVENTION

A variety of applications use power supplies to provide electrical power to a load. A power supply may receive electrical power from a line source, such as a wall outlet, and convert the power for use in a particular application. A load may respond to the delivery of power in a linear manner, such as a purely resistive load, or the response may be nonlinear. An induction motor that is used to drive typical exercise equipment is one example of a nonlinear load.

In one aspect, a power supply may convert an input line current from alternating-current (AC) to direct current (DC), and vice versa. A power supply may also be configured to boost the voltage supplied to a load prior to delivering power to the load. A load will often require power to be supplied at a constant voltage.

FIG. 1 illustrates a prior art circuit 10 that attempts to provide power to a load at an approximate constant voltage. The circuit 10 includes an AC power source 12 connected to a full-wave bridge rectifier circuit 14. The rectifier circuit 14 is comprised of a set of diodes 16, 18, 20, and 22. When the voltage signal from the power source 12 is positive with respect to point $AC_1$, current flows through diodes 16 and 18, charging the capacitor 24 as shown. When the voltage of the power source 12 is negative, current flows through diodes 20 and 22. The function of the rectifier circuit 14, in this case, is to convert the negative part of the sinusoidal input signal to a positive one, as shown by line 28 in FIG. 2A. The original sinusoidal input signal is shown by line 30. A capacitor 24 is connected to the output of the rectifier circuit 14 and, once charged, tries to maintain a constant voltage $V_{out}$ at the output during the operation of the circuit 10. The power supply circuit 10 is designed to deliver power to a load 26, here depicted as a resistor $R_{load}$.

FIG. 2B illustrates a problem that occurs with the prior art circuit of FIG. 1. In FIG. 2B, the sinusoidal voltage signal of the AC power source 12 is depicted by line 30. Though not illustrated in FIG. 2B, the input signal 30, once rectified as shown in FIG. 2A, appears as two positive half-waves. When the capacitor 24 is connected to the output of the bridge rectifier 14, the capacitor acts as a voltage reservoir and transforms the input voltage 30 into the output voltage $V_{out}$ depicted by line 34. During portions of each half-cycle of the input voltage 30, the output voltage 34 (i.e., the voltage on the capacitor 24 in FIG. 1) is greater than the input voltage 30. When the input voltage 30 exceeds the capacitor voltage 24, current flows from the power source 12 to the capacitor 24 and the load 26. The input current, shown as line 32, is drawn from the power source 12 with a large peak to average ratio. The sudden increase and decrease in current as shown by line 32 results in large harmonic content in the current waveform. The large peak to average ratio of the current also produces losses in the circuit, such as heating. The result is that the power drawn from the power source 12 may be much more than the power that can actually be used by the load 26.

The prior art has attempted to overcome this inefficiency in power transfer by use of power factor correction (PFC) circuits. The definition of power factor is the cosine of the angle between voltage and current waveforms and generally refers to the ratio of actual power drawn from a power source to the usable power in the load (i.e., the product of the voltage and current in the load). A circuit as shown in FIG. 1 may have a low power factor ranging from 0.5 to 0.7, where with power factor correction circuitry, the power factor may be increased and begin to approach a maximum power factor of 1.0.

Usable power in a load derives from components of the current and voltage waveforms that are in phase with each other. If an input current waveform is distorted from the input voltage waveform, as shown in FIG. 2B, the current waveform will have components at frequencies other than the frequency of the voltage. These components do not contribute to the usable power received by the load. They do, however, contribute to the average current drawn from the power source 12. PFC circuits reduce the harmonic content of the current waveform and minimize the phase angle between the input current and voltage so that the usable power received by the load is closer to the actual power drawn from the power source.

PFC circuits are widely known in the art and are generally considered a requirement for most off-line power supplies. PFC circuits may be comprised of active and/or passive components. Passive PFC circuits rely on a combination of inductors and capacitors to shape the current waveform. While a passive circuit is generally less complicated and less expensive to build than an active circuit, it is difficult to optimize a passive circuit for universal line operation.

One example of a prior art circuit with active PFC components is illustrated in FIG. 3. The circuit 40 is connected to an AC power source 42 via a rectifier circuit 44. For ease of description, the rectifier circuit 44 may be similar to the rectifier circuit 14 shown in FIG. 1. The circuit 40 uses a switch 46 (for example, a transistor) that controls the flow of current, and hence the input current waveform, drawn from the power source 42. When the switch 46 is closed (i.e., conducting), input current flows through an inductor 48 and the switch 46 to ground. When the switch 46 is "open" (i.e., non-conducting), current flows from the inductor 48 through diode 52 to the capacitor 50 and the load 76. Electrical current at the output of the circuit 40 is supplied by the inductor 48, the capacitor 50, and the power source 42. The inductor 48 and capacitor 50 act as energy storage components that help boost the output voltage $V_{out}$ and maintain it approximately constant.

The operation of the switch 46 is controlled by the circuitry depicted in the lower portion of FIG. 3. The switch 46 is generally opened and closed at a frequency much higher than the line frequency of the power source 42. As will be discussed briefly below, the output voltage $V_{out}$ is typically monitored and compared to a predetermined desired output so that the switch 46 can modulate the input current and maintain the desired output voltage. The input current waveform is also modulated by the switch 46 so that it more closely follows the input voltage waveform. Conventional techniques known in the art for modulating switch operation in a PFC circuit include pulse-width modulation (as shown in FIG. 3) and frequency modulation.

More specifically, the circuit 40 shown in FIG. 3 includes a multiplier 54 with three inputs. The first input (on line 56) is a measure of the input current sensed by sense resistor 58. The input on line 60 is a measure of the input voltage sensed by the sense resistor 58, which is filtered by a low pass filter 61 and squared by squaring circuit 62. Lastly, the input on line 64 is a measure of the output voltage sensed by sense resistors 66 and 67, and compared to a reference voltage $V_{ref}$ by a comparator 68.

The output of the multiplier is amplified and filtered by circuitry 70 and delivered to a pulse width modulator (PWM) 72. The output of the pulse width modulator 72 directs the gate driver logic 74 to produce a signal that opens and closes the switch 46. Because the construction and use of conventional PFC circuits, such as the one shown in FIG. 3, is widely known, persons having ordinary skill in the art will recognize the operation of the circuit 40 without further detail being provided herein. The output voltage and current from the circuit 40 is delivered to a load, such as load 76, which may be linear or nonlinear in nature.

While FIG. 3 depicts a circuit with active components for power factor correction, the circuit is also exemplary of deficiencies that arise in the prior art. Prior art PFC circuits are implemented in hardware, using multiple interconnected components typically formed of multiple integrated circuits, e.g., as shown in FIG. 3. Each of the integrated circuits has its own limitations and operating characteristics. Because of this, prior art PFC circuits are generally designed for a narrow range of input and output power and cannot handle power conversion over a wide range. Expanding the range of power that conventional PFC circuits can handle and still maintaining a constant power output is very expensive and difficult to implement.

The prior art is also limited in that conventional PFC circuits are implemented separately from other power circuits. For instance, it is often desired to take a boosted DC power produced by a PFC circuit and connect it to an inverter that produces an AC signal for driving an induction motor. Having a PFC circuit and an inverter implemented separately on different circuit boards, as done in the prior art, increases the complexity of the overall motor control circuit, is more susceptible to electrical noise, and is more difficult to cool, usually resulting in increased cost and size of the circuitry.

The invention described herein addresses these deficiencies and other shortcomings in the prior art.

SUMMARY OF THE INVENTION

In one aspect, an embodiment of the present invention provides a combined power supply and driver control module that includes a first connection for connecting the control module to an input power source, a rectifier circuit for rectifying input voltage received from the input power source and providing a rectified output for producing a DC power, and a switching device that receives the DC power from the rectifier circuit. The switching device modulates input current received from the input power source. The control module further includes a driver circuit connected to the switching device for providing an output power to a load and a second connection for connecting the control module to the load. In one implementation, the switching device includes a transistor in series connection with a diode, wherein the transistor is operable to modulate the input current from the power source. The rectifier circuit and the switching device may be combined and, in that implementation, comprise two or more transistors connected in series in which the transistors are operable to separately open and close, thereby rectifying the voltage and modulating the current received from the power source.

A control module constructed according to the invention may be used to provide power to a motor. In that aspect, the driver circuit of the module may be a DC motor driver and the load to which the control module is connected is a DC motor. Alternatively, the driver circuit may be a switched reluctance driver and the load to which the control module can be connected is a switched reluctance motor. The driver circuit may also be an inverter that provides an output AC power to a load, which may be an AC motor.

An optional temperature sensing device may be included in the control module to sense the temperature of the module and provide a corresponding output signal. In one implementation, the temperature sensing device is a thermistor. Energy storage elements may also be provided in the control module, particularly to assist in providing the DC power that is received by the switching device. In that aspect, the energy storage element may be an inductor, a capacitor, or a combination of both.

Further embodiments of the present invention may provide an intelligent control module that includes control circuitry for controlling the opening and closing of the switching device that modulates the current received from the power source. The control circuitry may be comprised of a digital processor that operates in accordance with instructions stored in a memory. By modulating the current received from the power source, the control circuitry may achieve an improved power factor in the control module. Power factor may be improved by modulating the input current to be closer in phase with the voltage of the input power source.

In still further embodiments, a single heat sink may be connected to the control module and configured to provide cooling for the entire module. A fan may also be included with the heat sink to improve the transfer of heat from the control module.

An embodiment according to another aspect of the present invention is a power factor correction circuit that includes an input connection for connecting to an input power source, rectifier circuitry for rectifying the input voltage received from the power source and providing the rectified output for producing a DC power, and switching circuitry configured to receive the DC power. The switching circuitry conducts input current from the input power source when the switching circuitry is closed. The power factor correction circuit further includes a digital processor that controls the opening and closing of the switching circuitry in accordance with instructions stored in memory to modulate the input current received from the power source.

The digital processor may be connected to a memory in which a lookup table is stored. The lookup table contains values that collectively represent a waveform. The digital processor is configured to read values from the lookup table and modulate the input current waveform based on the values read from the table.

The values in the lookup table may represent a sinusoidal waveform. Furthermore, the values may represent a waveform sampled at uniform intervals. The resolution of the waveform may be increased by increasing the number of values stored in the lookup table.

The power factor correction circuit may further include a zero crossing detector connected to the input power source. The zero crossing detector may be configured to produce a signal to the digital processor when a particular event occurs, such as the input voltage of the power source crossing a zero potential. The digital processor may be configured to commence reading values from the lookup table when an output signal from the zero crossing detector is received.

Yet another embodiment of the invention is a method of power factor correction in a circuit that includes providing a switch configured to open and close and conduct input current from an input power source when the switch is closed. Values previously stored in a memory are read from the memory, wherein the values collectively represent a current waveform. The opening and closing of the switch is controlled based on the values read from the memory to modulate the input current received from the power source.

The method may further comprise sensing the voltage of the input power source and modulating the input current to be closer in phase with the voltage of the power source. The input power source may also be sensed for an event, such as the voltage crossing a zero potential. Reading the values from the memory is commenced based on the occurrence of such an event. The values may be organized in the memory in the form of a lookup table.

In yet another embodiment, the present invention provides an article comprising a storage medium, the storage medium having instructions stored thereon in which, when the instructions are executed by a device, they result in carrying out the methods described above.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 5 depicts a look-up table with sine values stored in the DSP shown in FIGS. 4A and 4B;

DETAILED DESCRIPTION OF THE PREFERRED EMBODIMENT

The invention described herein is directed to a circuit for controlling a power supply that delivers electrical power to a load and is particularly suited for powering AC or DC motors in exercise equipment. While certain circuits of the present invention have a primary application in powering exercise equipment, it will be appreciated that circuits constructed according to the present invention may be used in other applications where electrical power is supplied to a load. Thus, specific descriptions of the invention relating to powering AC or DC motors for use with exercise equipment are intended to be illustrative.

Figure 1:
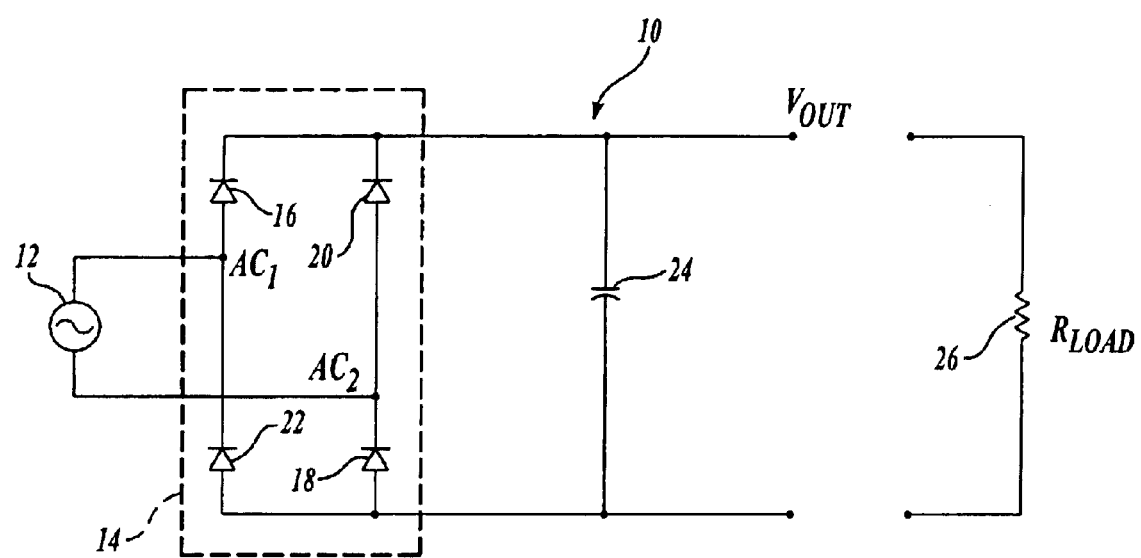
FIG. 1 is a diagram of a prior art power supply controller circuit without power factor correction.
Figure 4A:
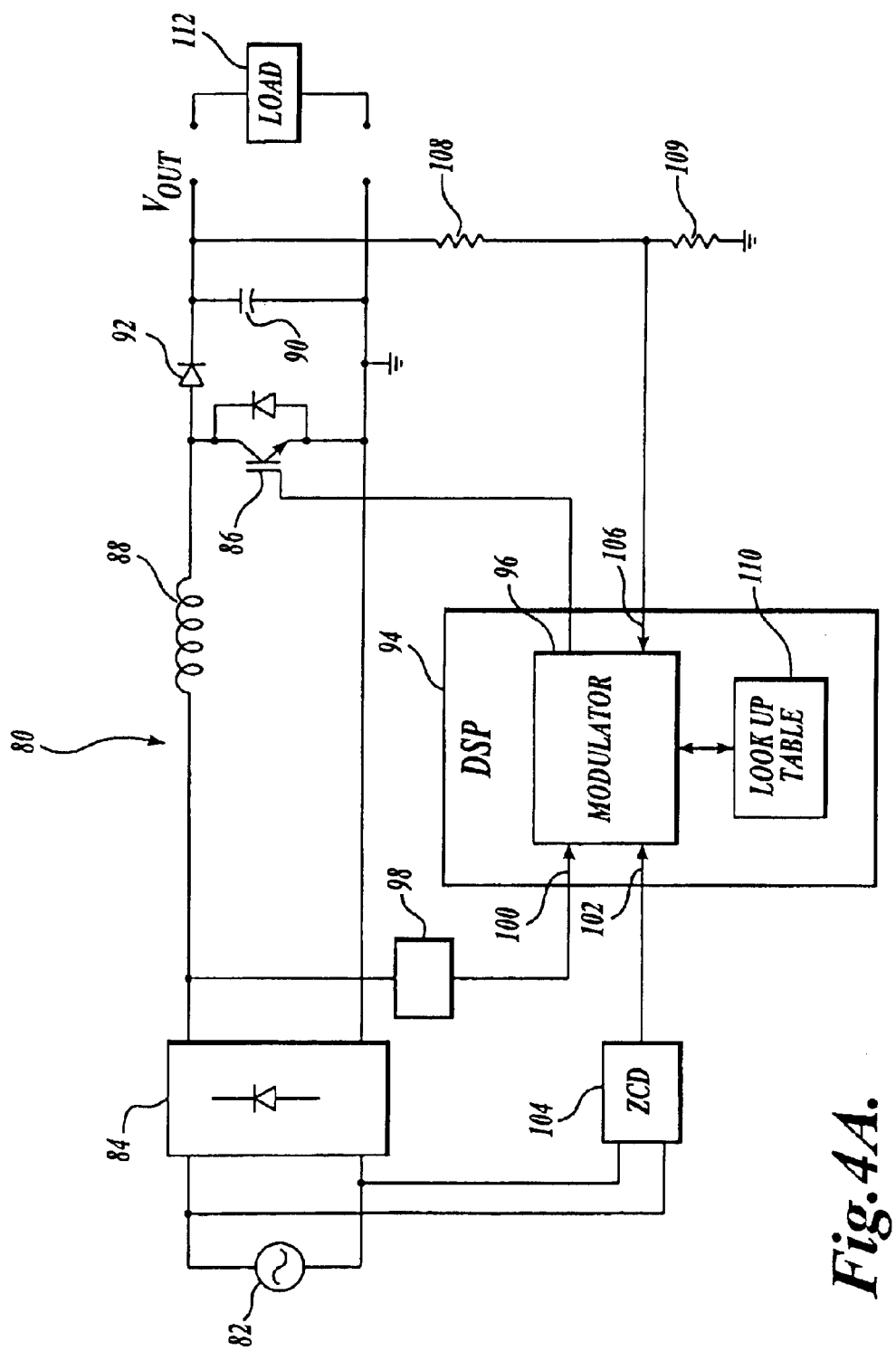
FIG. 4A is a diagram of a circuit with power factor correction controlled by a digital signal processor (DSP) in accordance with the present invention.

FIG. 4A is a diagram of one exemplary circuit 80 constructed in accordance with the principles of the present invention. The circuit 80 receives input voltage and current from an AC power source 82, such as a line current obtained from an electrical wall outlet. In this circuit, the input voltage from the power source 82 is rectified by a full-wave rectifier circuit 84. For ease of description, the rectifier circuit 84 may be constructed similar to the rectifier circuit 14 as shown in FIG. 1. Persons of ordinary skill in the art will appreciate that many other circuit configurations can be used to rectify and modulate characteristics of the input power, one example of which is described later herein in regard to FIG. 4B.

Figure 3:
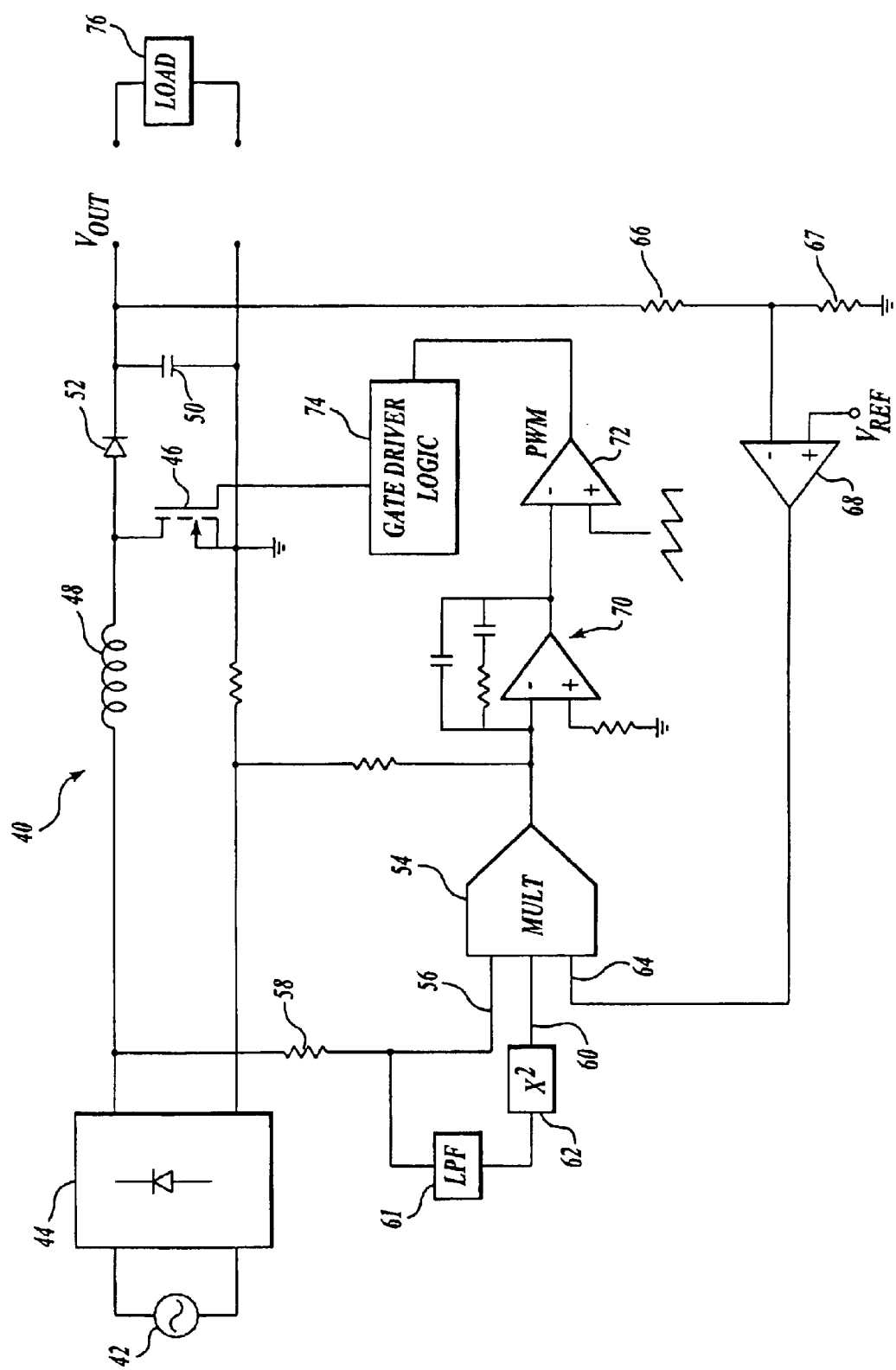
FIG. 3 is diagram of a prior art circuit with a combination of multiple active components providing power factor correction.

The circuit 80 uses elements of a basic boost topology, as shown in FIG. 3, including an inductor 88, a capacitor 90, and a diode 92. The diode 92 is connected in series between the inductor 88 and the capacitor 90, with the cathode of the diode 92 connected to the capacitor 90. Connected to the anode of the diode 92 is a transistor switch 86, in parallel with the capacitor 90. In this example, both the transistor switch 86 and the capacitor 90 are connected to ground, but such configuration is not a necessary requirement. Other embodiments of the circuit 80 may be left floating.

One aspect of the present invention that presents a significant advancement over prior art power factor correction is the use of a programmed digital signal processor (DSP) to control the opening and closing of the switch 86, and thus control the waveform of the input current that is drawn from the power source 82. Where the prior art uses multiple components that are interconnected in a complex fashion to achieve this function, the present invention uses digital signal processing to control the power factor correction.

A DSP typically integrates a variety of functional components into a single device, including programmable memory, arithmetic processors designed for fast operation, communication ports, pulse width modulation generators, analog-to-digital converters, comparators, components providing supervisory functions, etc. One such DSP that may be used is manufactured by Texas Instruments under part number TMS320F2407A, though persons of ordinary skill in the art will recognize many other commercially-available DSPs that can be used. Because a DSP is designed for fast arithmetic operation, it is capable of computing responses to input signals very quickly. For the present invention, this means that the modulation of the input current waveform can be quickly adjusted to adapt to changing circuit conditions, such as changing input and output voltage and frequency. This advantage and other advantages of using a DSP in the invention will become more apparent from the description of the invention herein.

FIG. 4A depicts a DSP 94 in block diagram form with several inputs and an output. The depiction of the DSP 94 is simplified to focus on the core operating characteristics of the DSP as they relate to the operation of the invention. Of course, the DSP 94 as implemented will have additional inputs and outputs as necessary, including typically a power input and output.

One portion of the DSP 94, shown in block diagram form, is a modulator 96 having a signal output that controls the opening and closing of the switch 86. The modulator 96 incorporates several aspects of the DSP including, for example, a portion of the DSP memory for holding program instructions that direct the operation of the modulator, processing circuitry that receives voltage and current inputs and calculates the output control signal to be delivered to the switch 86, driver circuitry that generates the voltage signal to be delivered to the switch 86, and communication circuitry that interfaces the DSP 94 with the remainder of the circuit 80. Another portion of the DSP 94 shown in block diagram form is a lookup table 110 which will be described in greater detail below.

Connected to the output of the rectifier circuit 84 is a current sensor 98. The current sensor 98 senses the input current received from the power source 82 through the rectifier circuit 84. The output of the current sensor 98 is delivered to the modulator 96 via input line 100. The construction of current sensors is well known in the art of electronics. For example, a sensing resistor or current transformer may be used. A current transducer may also be used, which incorporates a Hall Effect sensor and an amplifier, and is available in an off-the-shelf device.

Connected to the output of the circuit 80 are sense resistors 108 and 109 in a voltage divider configuration. The sense resistors 108 and 109 deliver a sensed output voltage to the modulator 96 via input line 106. The modulator 96 in turn uses the input current and output voltage information received on lines 100 and 106 to control the operation of the switch 86 so as to draw an input current that proportionately follows the waveform of the input voltage and maintains a constant voltage at the output.

As with the prior art PFC circuitry described in FIG. 3, the switch 86 in FIG. 4 is typically operated at a frequency that is much higher than the line frequency of the input power source 82. For example, in one implementation, the line frequency of the input power source 82 is 50/60 Hz, while the switch 86 is modulated to open and close at frequencies higher than 25 KHz. For a given, desired output power to be supplied by the circuit 80 to a load, such as load 112, the modulator 96 calculates the input current needed to maintain that desired power at the output. Also, as with the prior art circuitry shown in FIG. 3, the inductor 88 and capacitor 90 in FIG. 4A provide an energy storage function that smoothes the output voltage waveform and maintains the output voltage at the desired level (higher than the voltage of the input power source 82).

Prior to entering a steady state mode of operation, the circuit 80 undergoes a startup period in which the DSP takes into account the electrical characteristics of the desired output and observes the characteristics of the available electrical input. For example, given a desired output voltage $V_{out}$, the DSP 94 determines the level to which the capacitor 90 should be charged to maintain the desired output voltage. Furthermore, in one exemplary implementation of the invention, the desired output voltage $V_{out}$ is set based on the available input voltage. In this particular implementation, if the input voltage falls within a range of 90 volts to 240 volts, the circuit 80 sets the desired output voltage to 370 volts. If the input voltage is in the range of 240 volts to 270 volts, the desired output voltage is set to 410 volts. Other embodiments of the invention may set other voltage ranges and output voltage levels, or simply set the output voltage at a desired level without regard to the input voltage. Software instructions in the DSP memory are executed to adjust the gains of the circuit 80 to provide the desired output voltage. The voltage of the input power source 82 may be sensed during the initial startup period, prior to steady state operation, so that the capacitor 90 can be charged as required.

The DSP 94 provides another advantage in the present invention, in that the modulation of the input current waveform can be isolated from possible disturbances in the input voltage waveform. For example, the input line voltage may be carrying significant noise from an internal or external source. In the prior art, as exemplified by FIG. 3, the input voltage and current are fed into active components that directly produce a modulating signal for modulating the input current based on the input voltage. The result is that disturbances on the input voltage waveform are translated to the input current waveform and affect the power output of the circuit. In the present invention, the modulation of the input current waveform is isolated from the input voltage waveform by way of the modulator 96 in the DSP 94. As will be seen below, the modulator 96 is configured to artificially generate a waveform that directs the modulation of the switch 86.

In one preferred implementation, the modulator 96 generates a sinusoidal waveform for the input current by using a lookup table 110 stored in the DSP memory. The lookup table 110 contains a series of sine values. For instance, consider a half sine wave ranging from 0 to 180 degrees. The lookup table 110 contains a list of values determined by $\sin(\alpha)$ where $\alpha$ ranges from 0 to 180 degrees in discrete values. The number of sine values in the table 110 determines the accuracy of the input current waveform that the circuit 80 is trying to modulate. The lookup table 110 may contain a number of sine values depending on the desired resolution. Other embodiments of the lookup table 110 may have a higher or lower resolution (number of stored discrete values).

FIG. 5 is an illustration of a lookup table 110 with sine values. In FIG. 5, each entry in the lookup table is the value of $\sin(\alpha)$ where $\alpha$ is incremented from 0 to 180 degrees in uniform increments. Not all values are shown in FIG. 5; ellipses are used to represent the values omitted solely for the sake of the drawing. During each half-cycle of the input voltage, the modulator 96 (shown in FIG. 4A) reads the sine values from the lookup table 110 and uses the values to determine the time and frequency at which the switch 86 is open and closed.

The modulator 96 modulates the operation of switch 86 to draw a sinusoidal input current that is in phase with the input voltage. To that end, it is necessary that the modulator 96 know the frequency of the input voltage. One preferred implementation of the invention, shown in FIG. 4A, includes a zero crossing detector (ZCD) circuit 104 that is connected to the input power source 82. The output of the ZCD 104 changes from a high signal to a low signal, or vice versa, each time the ZCD 104 detects the input voltage waveform crossing a zero potential. The ZCD 104 thus produces a pulse change at the beginning of each half-wave of the input voltage. Preferably, the ZCD 104 is built with hysteresis to guard against noise in the input voltage. The output of the ZCD 104 is delivered to the modulator 96 via line 102, which enables the modulator 96 to determine the frequency of the input voltage.

The construction of zero crossing detectors is known in the art. Other embodiments of the invention may use zero crossing detectors that, instead of changing from a high to low signal, or vice versa, each time a zero potential is crossed, the detector outputs a short-length pulse signifying a zero crossing. One reference that describes suitable zero crossing detectors for use in the invention may be found in Graf, R. F., et al., *Encyclopedia of Electronic Circuits*, McGraw Hill/TAB Electronics, 1998, pp. 727–729. See also p. 61 of "Comparator Considerations and Applications," D. Pippenger et al., PCIM (Texas Instruments), February 1989.

During the startup period referenced earlier, the modulator 96 observes a number of pulse changes from the ZCD 104 to gauge the frequency of the input voltage. In one exemplary implementation, the modulator 96 observes approximately 30 pulse changes, which for a line input at approximately 50 Hz, takes approximately 0.3 seconds. Since a pulse change signifies the beginning of a new half cycle for the input, the frequency of the input voltage is calculated to be one-half the number of pulse changes divided by the time of observation. Knowing the frequency of the input voltage, the modulator 96 determines the rate at which sine values must be read from the lookup table 110 to produce the output control signal that controls the operation of the switch 86.

Ideally, the modulator 96 reads sine values from the lookup table 110 at a rate where the beginning and end of the table 110 coincide with the beginning and end of each half-wave of the input voltage. The modulator 96 recognizes that the frequency of the input voltage may vary during operation of the circuit 80. Accordingly, the modulator 96 is preferably configured to commence reading sine values from the lookup table 110 each time a pulse change from the ZCD 104 is received. If the frequency of the input voltage has increased, and a new half-wave of the input voltage is detected before the modulator 96 has reached the end of the lookup table 110 for the previous half-wave, the modulator 96 preferably interrupts its process of reading sine values from the lookup table 110 and begins reading again at the beginning of the lookup table at a faster rate. The modulator 96 is capable of adjusting the rate at which it reads sine values from the lookup table 110 by monitoring the output of the ZCD 104.

During operation of the circuit 80, the modulator 96 uses the sine values read from the lookup table 110 to generate the control signal that opens and closes the switch 86. More specifically, during each half-cycle of the input voltage, the modulator 96 reads the sine values from the lookup table 110 and applies them to an algorithm that calculates the "on-time" of the switch 86 (i.e., the time during which the switch 86 is closed). The sine values in the table 110 represent a half-sinusoidal waveform. Assuming the input voltage is sinusoidal, the sine values are used internally to artificially represent the shape of the input voltage. The actual shape of the input voltage (with possible noise, delays, and other disturbances) is thus isolated from the PFC circuit control, and does not affect the modulation of the input current.

Different algorithms known in the art may be used to calculate the "on-time" of the switch 86. The selection of algorithm may depend on whether the circuit 80 is to be operated in a continuous conduction mode (CCM), critical conduction mode (CRM), or discontinuous conduction mode (DCM). Where prior art PFC circuits use the actual sensed input voltage to direct the modulation of the input current, the DSP control provided by the present invention uses the artificially-generated input voltage waveform to modulate the input current waveform. The reading of each sinusoidal half-cycle from the table 110 is triggered by the output of the ZCD 104 (signaling the beginning of each new input voltage half wave). Modulation of the input current waveform is accomplished by modulating the switch control signal output from the modulator 96. The switch control signal turns the switch 86 on and off at a determined duty cycle and frequency. Over the course of an input voltage half-cycle, the modulator 96 may increase or decrease the duty cycle and/or frequency of the switch control signal. The result of the modulation is an input current waveform that more closely matches the waveform of the input voltage.

Figure 2A:
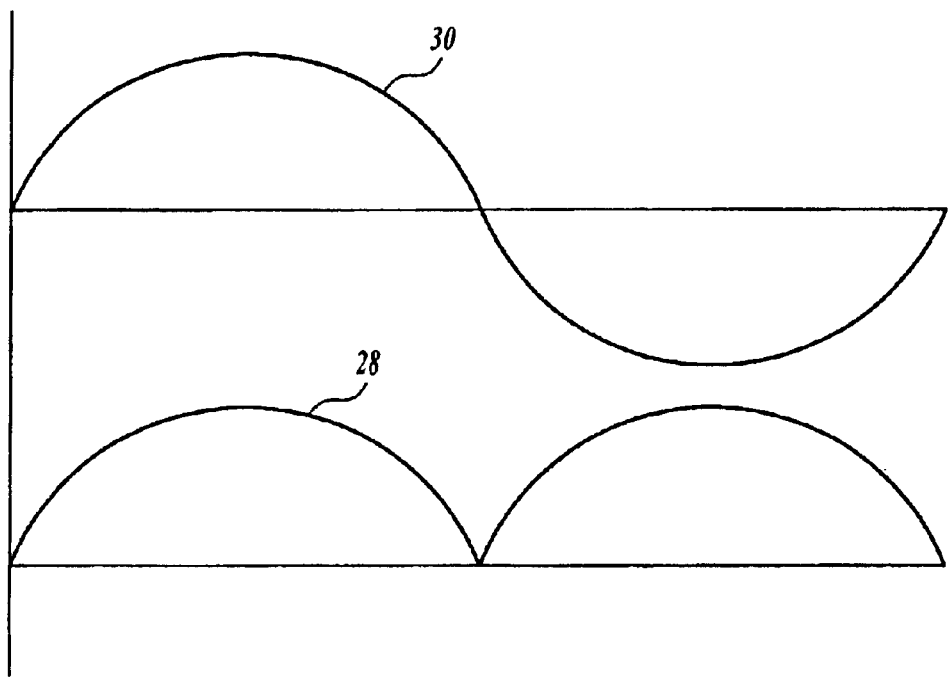
FIG. 2A is a graph depicting a voltage waveform from an input power source before and after the voltage is rectified by a bridge rectifier shown in FIG. 1.
Figure 2B:
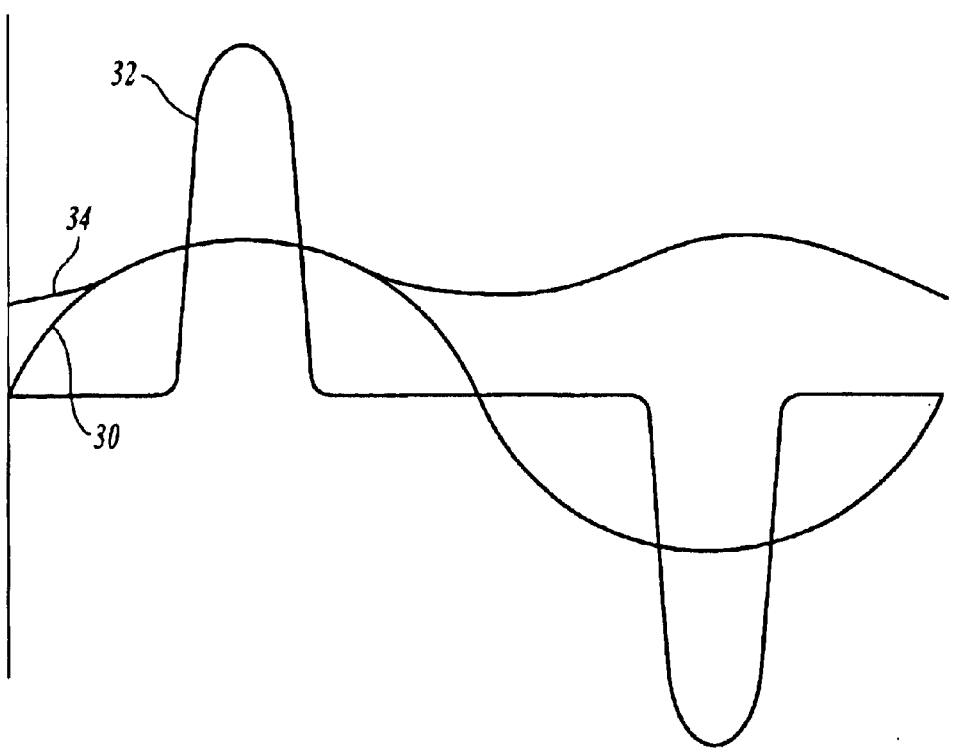
FIG. 2B is a graph depicting voltage and current waveforms from an input power source and an output voltage produced by the circuit shown in FIG. 1.
Figure 6:
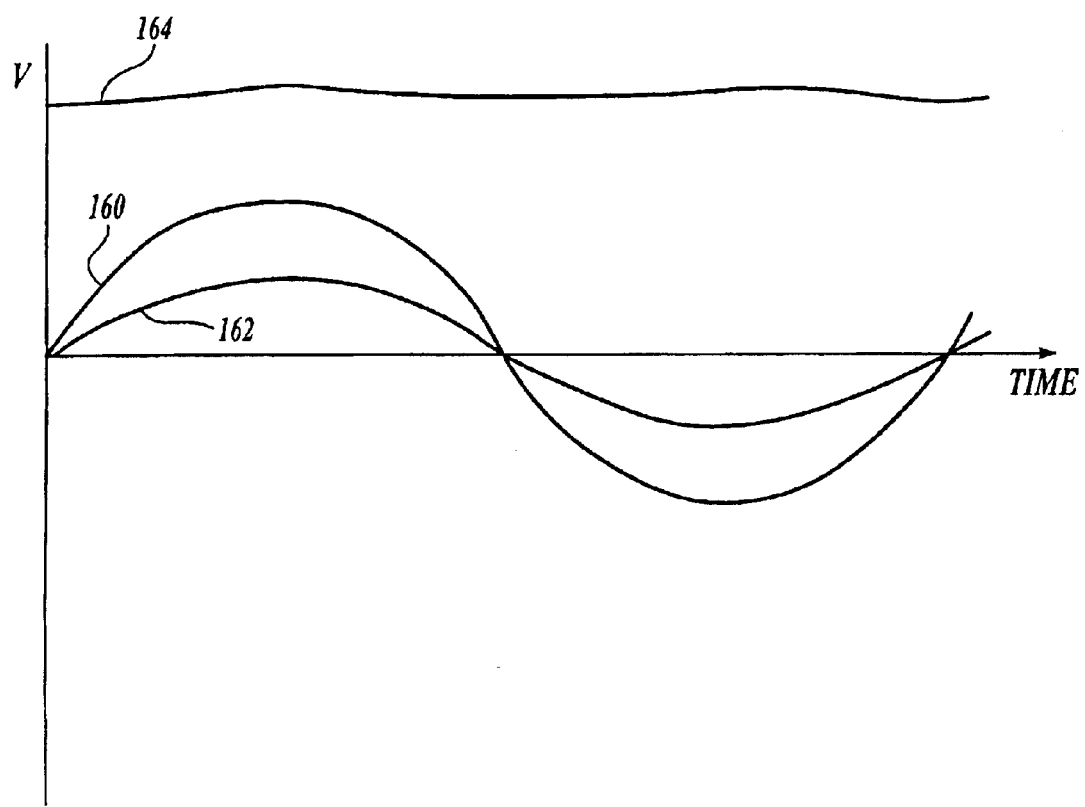
FIG. 6 is a graph depicting input voltage and current waveforms drawn from the input power source shown and an output voltage produced by the circuits in FIGS. 4A and 4B.

FIG. 6 is a graph of a sinusoidal input voltage waveform 160 and an input current waveform 162 that results from using a PFC circuit constructed according to the present invention. The output voltage is depicted by line 164. Compare the waveforms 160 and 162 in FIG. 6 to the waveforms 30 and 32 in FIG. 2. Because the input current 162 is closer in phase to the input voltage 160, a greater amount of the power drawn from the input power source is usable by the load. Where the power requirement of the load is the same as in the prior art, use of a PFC circuit according to the invention results in a lower amount of power drawn from the input power source. This typically results in a cost savings, as well as less cooling required for losses (from heating) in the power supply circuit.

Some conventional PFC circuits have attempted to remove disturbances, such as noise, on the input voltage waveform by filtering the input voltage signal. See block 61 in FIG. 3. However, filtering the input voltage introduces delay into the circuit. Because of this delay, which may be significant, conventional PFC circuits are unable to closely match the beginning and end of the input current waveform with the beginning and end of the input voltage waveform. In contrast, using the high speed arithmetic processing the DSP 94 in the circuit 80, the input current is more quickly modulated and more closely matches the phase of the input voltage. Any delays due to DSP processing are negligible compared to the delays introduced by the filtering provided in conventional PFC circuits.

The control provided by the digital signal processor shown in FIG. 4A and elsewhere herein is exemplary of the digital processing that may be used in the present invention. More broadly, the digital processing in the present invention may be implemented by one or more devices that include logic circuitry. The device performs functions and/or methods as are described in this document. The logic circuitry may include a processor that is programmable for a general purpose, or dedicated, such as microcontroller, a microprocessor, a digital signal processor, etc. For example, the digital processing described above in connection with DSP 94 may be performed by a digital computer-like device, such as a general-purpose computer selectively activated or reconfigured by software instructions stored in a memory. Alternatively, the device may be implemented an application specific integrated circuit (ASIC), etc.

The invention also includes storage media that, individually or in combination with others, have stored thereon software instructions that make a digital processor operate according to the invention. A storage medium according to this aspect of the invention is a computer-readable medium that can be read and executed by a digital processor. A person skilled in the art of programming may use the description of the invention herein, along with knowledge in the art, to readily generate specific software instructions for implementing the present invention.

Figure 4B:
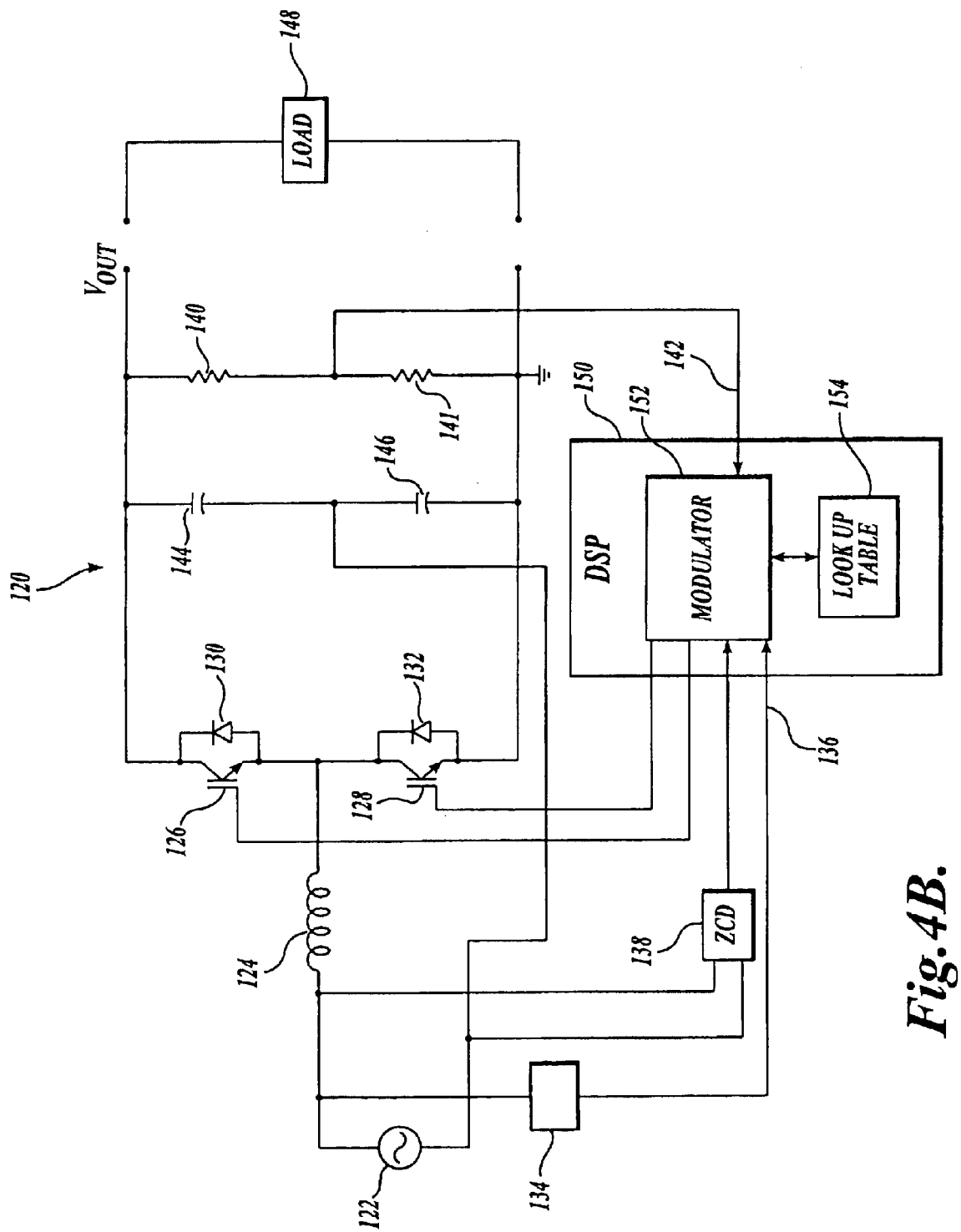
FIG. 4B is a diagram of an alternate embodiment of a circuit with power factor correction controlled by a DSP in accordance with the present invention.

As noted earlier, the circuit 80 shown in FIG. 4A is merely one example of a circuit with power factor control constructed in accordance with the principles of the present invention. Other circuit designs are well within the capacity of persons having ordinary skill in the art in view of the invention. FIG. 4B illustrates one alternative circuit 120.

In FIG. 4B, the circuit 120 uses an arrangement of transistor switches and capacitors to rectify and modulate the input power and deliver output power to a load, such as load 148. The circuit 120 also uses a digital signal processor (DSP) 150 with characteristics similar to the DSP 94 described in regard to FIG. 4A.

The circuit 120 shown in FIG. 4B is connected to an AC power source 122. An inductor 124 is connected in series between the power source 122 and the midpoint of two series-connected transistor switches 126 and 128. The switches 126 and 128 each have a fly-back or anti-parallel diode 130 and 132, respectively. The operation of the switches 126 and 128 are controlled by the DSP 150 as discussed below.

A portion of the DSP 150 is configured to be a modulator 152 that operates similar to the modulator 96 described earlier. In particular, the modulator 152 incorporates several aspects of the DSP, including memory for holding the program instructions that direct the operation of the modulator 152, processing circuitry that receives voltage and current signals and calculates the output control signals to be delivered to the switches 126 and 128, driver circuitry that generates the voltage signals that are sent to the switches 126 and 128, communication circuitry, etc. Another portion of the DSP 150 shown in block diagram form is a lookup table 154 that may be configured similar to the lookup table 110, described in regard to FIG. 4A.

Connected to the power source 122 is a current sensor 134 that produces a sensed input current that is delivered to the modulator 152 via input line 136. Connected to the output of the circuit 120 are sense resistors 140 and 141 (configured as a voltage divider) that deliver a sensed output voltage to the modulator 152 via input line 142. The modulator 152 uses the input current and output voltage information to control the operation of the switches 126 and 128 so as to rectify the input voltage and modulate the input current waveform to proportionately follow the waveform of the input voltage.

A zero crossing detector (ZCD) circuit 138 is connected to the power source 122 and produces a signal at the beginning of each half wave of the input voltage as the voltage waveform crosses a zero potential. The output from the ZCD 138 is delivered to the modulator 152. The modulator 152 is thus capable of determining and monitoring the frequency of the input voltage.

As with the circuit 80 in FIG. 4A, the circuit 120 in FIG. 4B preferably undergoes a startup phase in which the capacitors 144 and 146 are charged to a level required for maintaining the output voltage $V_{out}$ at a desired level. During the startup phase, the modulator 152 receives a number of pulses from the ZCD 138 and determines the frequency of the input voltage.

The lookup table 154 contains a set of values that the modulator uses in controlling the opening and closing of the switches 126 and 128. In a preferred implementation, the lookup table 154 is comprised of a set of values representing $\sin(\alpha)$ where $\alpha$ ranges from 0–180 degrees (i.e., a half-wave). The modulator 152 uses the frequency of the input voltage to set the timing and rate at which sine values are read from the lookup table 154 during the operation of the circuit 120. As with the modulator 96 in FIG. 4A, the modulator 152 in FIG. 4B preferably reads sine values from the lookup table 154 at a rate such that the end of the lookup table is reached at the end of each half-wave of the input voltage. The DSP 150 is programmed to adjust for detected changes in the frequency of the input voltage and set the rate at which sine values are read from the lookup table 154.

In FIG. 4B, the operation of switch 126 is complimentary to that of switch 128. In other words, when switch 126 is closed (i.e., conducting), the switch 128 is open (i.e., non conducting), and vice versa. Accordingly, when the power source 122 is delivering a positive voltage to the left side of the inductor 124 (positive half cycle) and the modulator 152 outputs a signal that closes switch 128, current flows from the power source 122 through the inductor 124, switch 128, capacitor 146, and back to the power source 122. When the modulator 152 outputs a signal that opens switch 128 during the positive cycle, current flows from the power source 122, through the inductor 124, diode 130, capacitor 144 and back to the power source 122. When the power source 122 is delivering a negative voltage to the left side of the inductor 124 (negative half cycle) and the modulator 152 outputs a signal that closes switch 126, current flows from the power source 122, through the capacitor 144, switch 126, inductor 124, and back to the power source 122. When the modulator 152 outputs a signal that opens the switch 126 during the negative half cycle, current flows from the power source 122, through capacitor 146, diode 132, inductor 124, and back to the power source 122. As with the switch 86 in FIG. 4A, the switches 126 and 128 are typically opened and closed at a frequency that is much higher than the line frequency of the input power source 122. It should be understood that the IGBT switches illustrated in FIGS. 4A and 4B are exemplary only, and may be comprised of MOSFET or bipolar transistors, or any other kind of active switching device.

Algorithms known in the art may be used to calculate the "on-time" of the switches 126 and 128, based on the sensed input and output voltages and waveform values read from the lookup table 154. The algorithm selected for a particular application may depend on whether the circuit 120 is to be operated in a continuous conduction mode, critical conduction mode, or discontinuous conduction mode.

A further aspect of the present invention is the integration of power factor correction (PFC) circuitry with a driver that produces an output power for driving a load, such as a motor typically used in exercise and fitness equipment. A single module containing power supply control with power factor correction combined with a motor driver is not known in prior art fitness equipment.

Figure 7A:
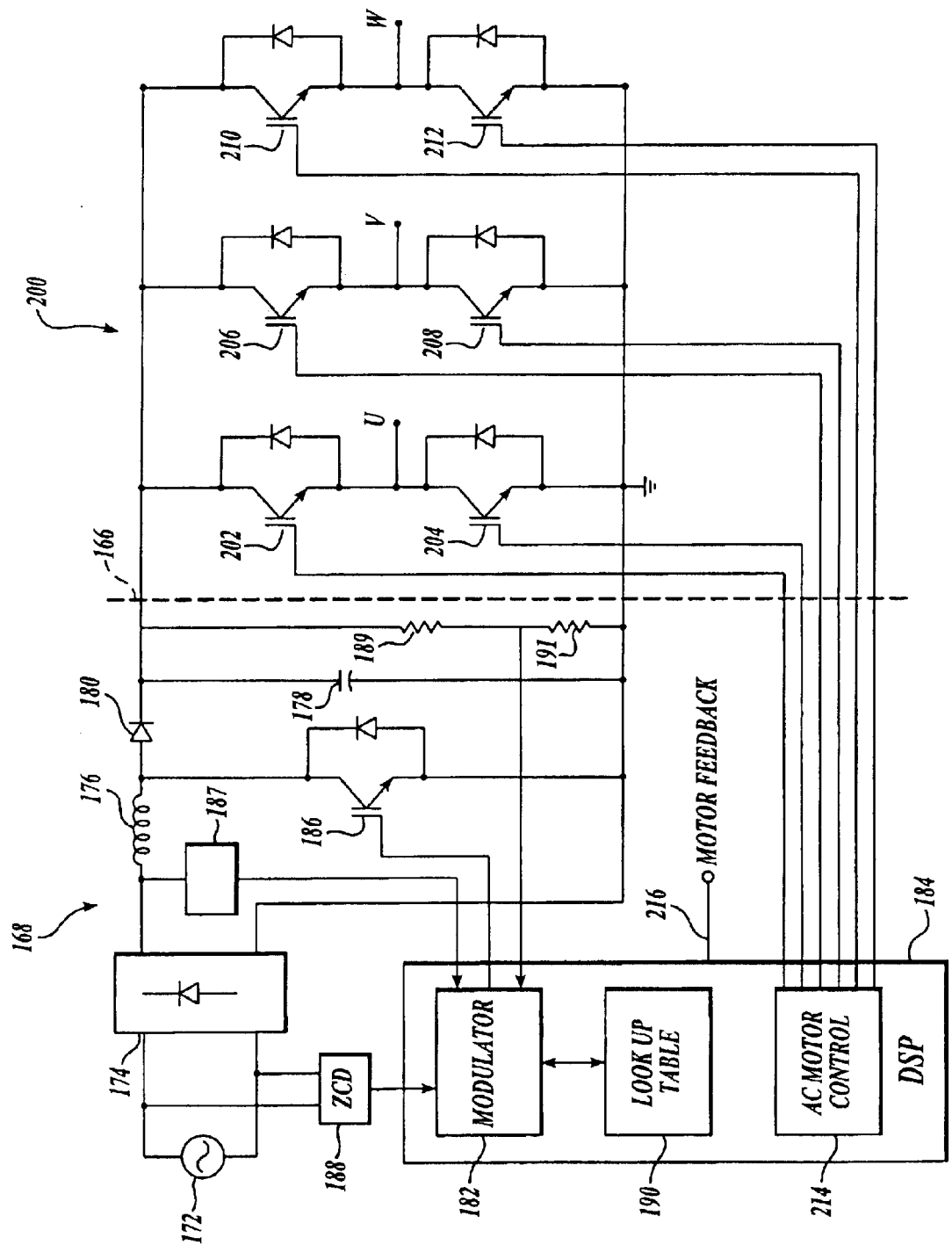
FIG. 7A is a diagram of a combined power supply controller with power factor correction circuitry and AC motor driver constructed in accordance with the present invention.

FIG. 7A depicts one possible embodiment 170 of a combined power supply control and motor driver constructed in accordance with the present invention. The portion of the circuit 170 on the left side of the dotted line 166 is a power supply controller circuit 168 with power factor correction features. The portion of the circuit 170 on the right side of the dotted line 166 is an inverter 200 that receives an input DC power and produces, in this instance, a three-phase AC power output.

The circuit portion 168 may be configured to operate in a manner similar to that of the circuit 80 shown in FIG. 4A. Specifically, the voltage of an input AC power source 172 is rectified by a rectifier circuit 174. An inductor 176, capacitor 178 and diode 180 are used to boost the DC voltage provided to the inverter 200. A switch 186 is controlled by a modulator 182 in a digital signal processor (DSP) 184 similar to the manner in which the switch 86 shown in FIG. 4A is controlled by the modulator 96. A zero crossing detector (ZCD) circuit 188 informs the modulator 182 of the beginning of each half-wave of the input voltage. The modulator 182 receives a sensed input current via a current sensor 187. The modulator 182 also receives a sensed output voltage via sense resistors 189 and 191. The modulator 182 reads waveform values from a lookup table 190 to control the operation of the switch 186.

The output of the circuit portion 168 is a boosted DC voltage. The input voltage and current are approximately in phase due to the input current modulation provided by the modulator 182 and switch 186.

Figure 8A:
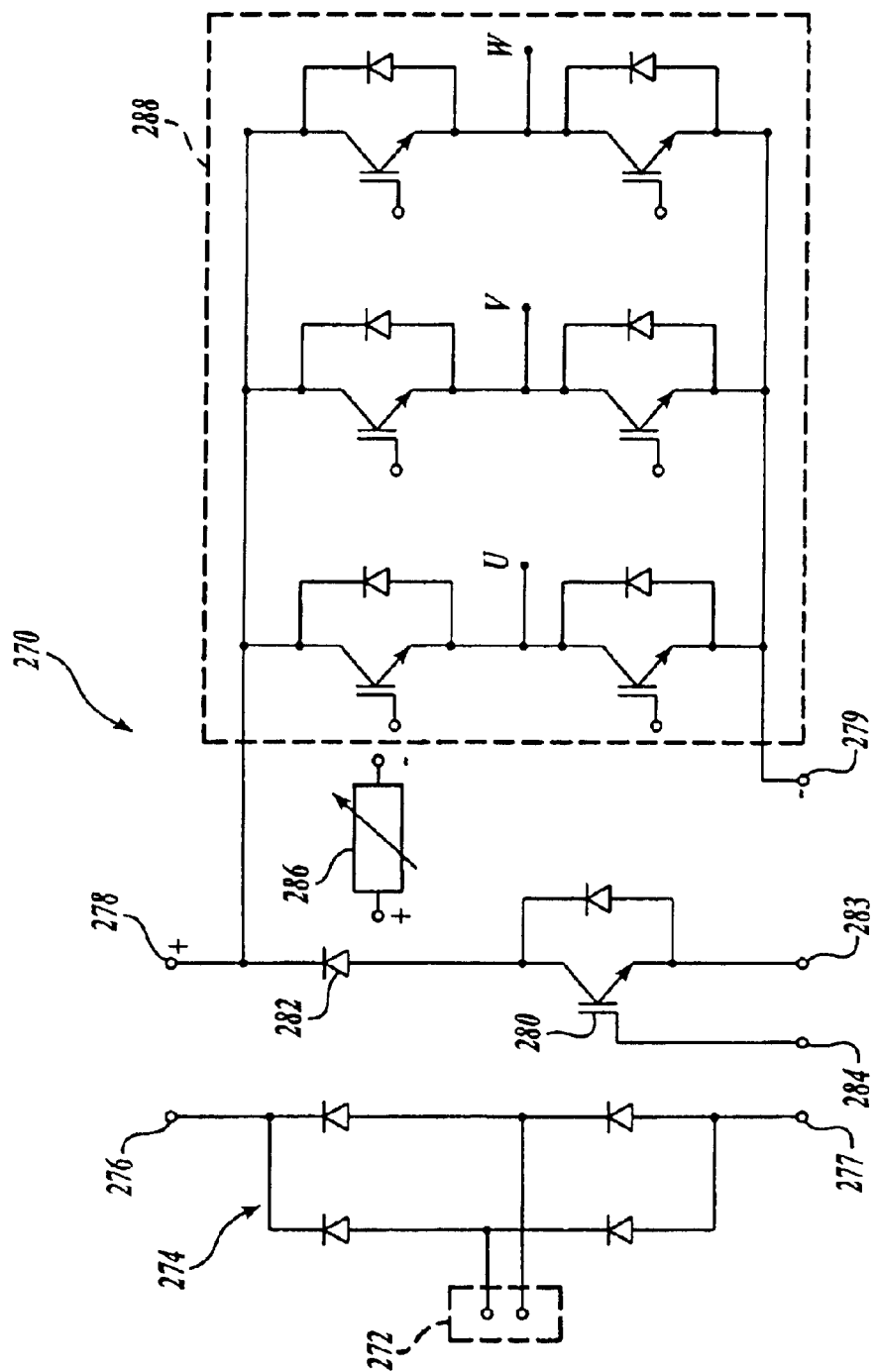
FIG. 8A is a diagram of a combined power supply and driver control module constructed in accordance with the present invention.

The power components for the inverter 200 and the power components for the power factor correction circuitry 168 may be implemented in the same module as shown in FIG. 7A, and more simply in FIG. 8A. The dotted line 166 in FIG. 7A is shown only for ease of discussion to visually separate the functions of the circuit 170. The dotted line 166 does not constitute a structural element or limitation of the circuit 170.

The inverter 200, in one exemplary implementation, includes an arrangement of transistors, preferably IGBTs, that produces a three-phase AC output power. In the particular arrangement shown, transistor 202 is connected in series with transistor 204 between the DC power and ground, each transistor having a corresponding anti-parallel diode. Connected between the transistors 202 and 204 is an output U providing the first phase of the output power.

In similar fashion, transistor 206 is connected in series with transistor 208 between the DC power and ground, both transistors having respective anti-parallel diodes. An output V connected between the transistors 206 and 208 provides the second phase of the output power. Likewise, transistor 210 is connected in series with transistor 212, both with anti-parallel diodes. An output W connected between the transistors 210 and 212 provides the third phase of the output power.

Each of the transistors 202, 204, 206, 208, 210 and 212 are shown controlled by AC motor control circuitry 214 in the circuit portion 168. In the particular implementation shown in FIG. 7A, the AC motor control circuitry 214 is implemented within the DSP 184. In other words, the AC motor control circuitry 214 includes DSP memory with programmed instructions that instruct signal generating hardware in the DSP 184 to provide output signals that drive the inverter transistors. Other embodiments of the invention may use conventional inverter control circuitry separate from the DSP 184. The sequence and timing of control signals for operating an inverter, such as inverter 200, are known in the art. Also known in the art are different types of AC motors that an inverter, such as inverter 200, can be configured to operate, including an AC induction motor, a permanent magnet synchronous motor, a brushless motor, etc.

The AC motor control circuitry 214 preferably receives feedback from the motor to which the circuit 170 is connected so that the control circuitry 214 may adjust the operation of the inverter 200 as needed. For ease of description, feedback from an AC motor (not shown) that is connected to the outputs U, V, and W of the circuit 170 is provided to the DSP 184 via line 216. Persons having ordinary skill in the art of motor control and design will appreciate numerous other variations for motor control and feedback. For example, field-oriented control may be used, with the motor reporting its rotational speed back to the AC motor control circuitry 214.

Figure 7B:
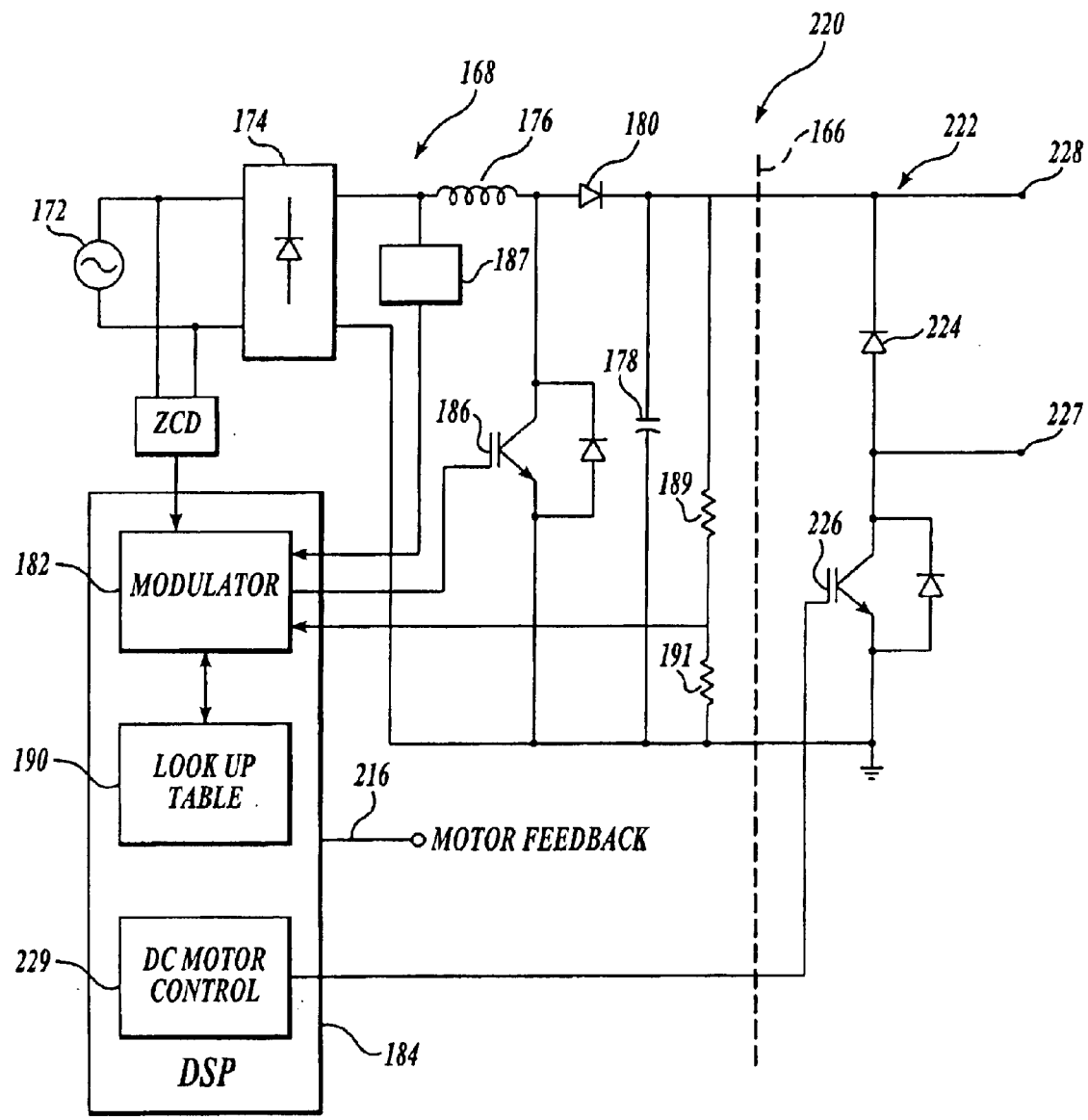
FIG. 7B is a diagram of a combined power supply controller with power factor correction circuitry and DC motor driver constructed in accordance with the present invention.

FIG. 7B depicts another possible embodiment of a combined power supply control and driver circuit constructed in accordance with the present invention. Like-numbered reference numerals in FIGS. 7A and 7B indicate similar elements that operate in a similar fashion. Accordingly, the portion of circuit 220 on the left side of the dotted line 166 is a power supply controller circuit 168 with power factor correction features as described above. The portion of the circuit 220 on the right side of the dotted line 166 is a DC motor driver 222 arranged in a "chopper" configuration. The motor driver 222 includes a diode 224 and transistor switch 226 connected in series between the input DC power and ground. The transistor switch 226 is connected to the anode of the diode 224, and further includes an anti-parallel diode connected thereto. Outputs 227 and 228 are provided on the anode and cathode, respectively, of the diode 224 for connecting the circuit 200 to the terminals of a DC motor.

The power components for the motor driver 222 and the power components for the power factor correction circuitry 168 may be implemented in the same module. As with FIG. 7A, the dotted line 166 in FIG. 7B is shown only to visually separate the functions of the combined circuit 220 for purposes of discussion herein. Moreover, the particular embodiment shown in FIG. 7B uses a DC motor control circuit 229 that is implemented within the DSP 184 to control the motor driver 222. In other words, the DC motor control circuit 229 includes DSP memory with programmed instructions that direct signal generating hardware in the DSP 184 to provide the output signal that drives the motor driver transistor switch 226. Other embodiments of the invention may use conventional DC motor control circuitry separate from the DSP 184. Feedback from a DC motor (not shown) connected to the outputs 227 and 228 is preferably provided to the DC motor control circuit 229, e.g., as shown by line 216 in FIG. 7B. Other variations for motor control and feedback design are possible.

Figure 7C:
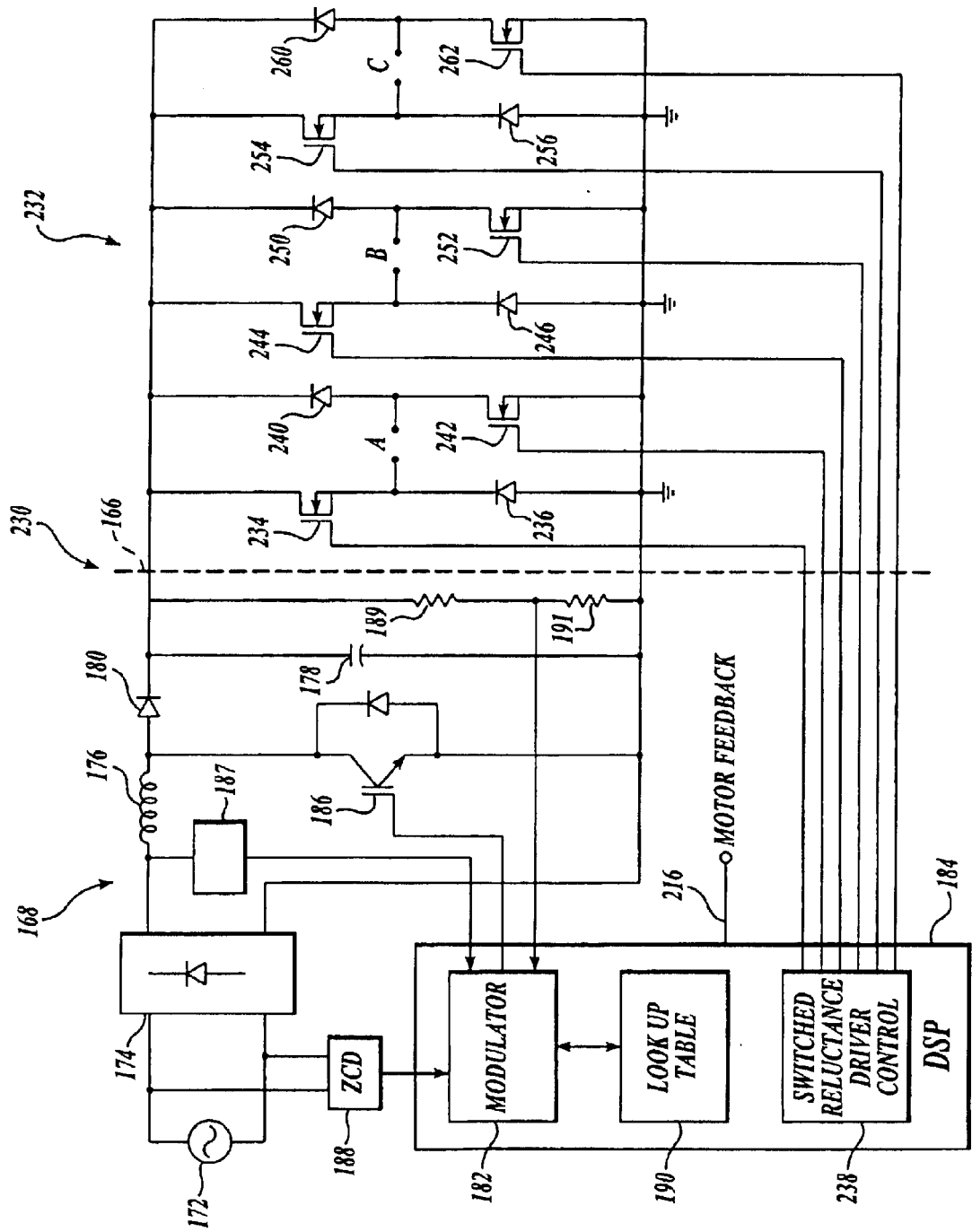
FIG. 7C is a diagram of a combined power supply controller with power factor correction circuitry and switched reluctance motor driver constructed in accordance with the present invention.

FIG. 7C illustrates yet another possible embodiment of a combined power supply control and driver circuit constructed in accordance with the present invention. As with FIGS. 7A and 7B, like-numbered reference numerals in FIG. 7C indicate similar elements that operate in a similar fashion to those respective elements previously described. Accordingly, the portion of circuit 230 on the left side of the dotted line 166 is a power supply controller circuit 168 with power factor correction features that operate as described above in regard to FIG. 7A. The portion of the circuit 230 on the right side of the dotted line 166 is a switched reluctance motor driver 232 that receives an input DC power and produces a three-phase AC power output for driving a switched reluctance motor (SRM). Other AC power output designs may be used for the reluctance driver 232, depending on the type of reluctance motor it is intended to drive.

The reluctance driver 232, in this implementation, includes an arrangement of transistors and diodes. While MOSFET transistors are illustrated, other switching devices such as IGBTs and bipolar transistors may be used.

The first phase of the output power produced by the reluctance driver 232 is provided by the arrangement of transistors 234, 242 and diodes 236, 240. Specifically, the transistor 234 is series connected to the cathode of the diode 236 between the input DC power and ground. In a parallel but opposite configuration are transistor 242 and diode 240, in which the anode of the diode 240 is series connected to the transistor 242 between the DC input and ground. Connected to the cathode of diode 236 and the anode of diode 240 are two respective outputs that are configured to connect across the first windings A of a switched reluctance motor attached to the circuit 230.

The second and third phases of the output power provided by the reluctance driver 232 are produced in a manner similar to the first phase described above. Specifically, a transistor switch 244 is series connected to the cathode of diode 246 between the input DC power and ground. In parallel but opposite configuration, the anode of diode 250 is series connected to a transistor switch 252 between the input DC power and ground. Connected to the cathode of the diode 246 and the anode of the diode 250 are two respective outputs that are configured to connect across the second windings B of a switched reluctance motor.

Similarly, a transistor switch 254 is series connected to the cathode of diode 256 between the input DC power and ground. In parallel but opposite configuration is the anode of diode 260 connected in series to transistor switch 262 between the input DC power and ground. Connected to the cathode of the diode 256 and the anode of the diode 260 are two respective outputs that are configured to connect across the third windings C of a switched reluctance motor.

Each of the transistors 234, 242, 244, 252, 254, and 262 are shown controlled by the switched reluctance driver control circuitry 238 in the DSP 184. The reluctance driver control circuitry 238 includes DSP memory with programmed instructions that instruct signal generating hardware in the DSP 184 to provide output signals that drive the reluctance driver transistors. Other embodiments of the invention may provide conventional switched reluctance driver control circuitry separate from the DSP 184. The timing and sequence of control signals for operating a switched reluctance driver, such as driver circuit 232, are known in the art.

Preferably, the switched reluctance driver control circuitry 238 also receives feedback from the switched reluctance motor to which the driver circuitry 232 is connected so that the control circuitry 238 may adjust the operation of the driver circuit 232 as needed. As with FIGS. 7A and 7B, feedback from a switched reluctance motor connected to the driver circuit 232 may be provided to the DSP 184 via line 216.

A combined power supply and driver control module constructed in accordance with the present invention need not include all of the elements depicted in FIGS. 7A, 7B, or 7C. A simpler module may be constructed with pins that allow additional elements to be added to the circuit contained in the module. For example, FIG. 8A depicts an embodiment of a combined power supply and driver control module 270 that is simpler than the module circuits shown in FIGS. 7A, 7B, and 7C. The control module 270 includes a first connection 272 with two lines for connecting the control module 270 to an input power source, such as the power source 172 shown in FIG. 7A. A rectifier circuit 274 is connected to the first connection 272 for rectifying the voltage of the input power received from the input power source. The rectifier circuit 274, shown in this example as a bride rectifier, provides positive and negative rectified outputs at pins 276 and 277, respectively, for producing a DC power in the circuit 270.

Pins 278 and 279 are provided in the circuit 270 for connecting to the positive and negative DC power obtained from the rectifier circuit 274. An energy storage element, such as an inductor or capacitor, may be connected to the DC power pin 278. For example, an inductor may be connected between pins 276 and 278, similar to the inductor 176 shown in FIG. 7A. A capacitor may be connected between pins 278 and 279, in a manner similar to the capacitor 178 shown in FIG. 7A.

The control module 270 provides circuitry for power factor correction, including a switching device comprised of a transistor switch 280 connected in series to the anode of a diode 282. As shown, the cathode of the diode 282 is connected to the positive DC power pin 278 and the output of the transistor switch 280 is connected to an intermediate pin 283. In some implementations of the invention, the intermediate pin 283 is connected directly to the negative DC power pin 279. In other implementations, a resistor may be connected between the intermediate pin 283 and the negative DC power pin 279, particularly where the negative DC power pin 279 is directly connected to the negative rectified output pin 277. A control input pin 284 is provided for connection to the transistor switch 280 to control the opening and closing of the switch 280. The switch 280 and diode 282 may be compared to the switch 186 and diode 180 shown in FIG. 7A.

The control module 270 may optionally include a temperature sensing device 286 that monitors the temperature of the module. In FIG. 8A, the temperature sensing device 286 is depicted as a thermistor with positive and negative output pins for connection to control circuitry (not shown) that is preferably configured to power down the circuit 270 should the temperature exceed a determined limit.

Lastly, the control module 270 includes a driver circuit 288 connected to the switching device (i.e., the transistor switch 280 and diode 282) for providing an output power to a load. In the particular embodiment shown in FIG. 8A, the driver circuit 288 is an inverter that provides an output AC power, here specifically a three-phase AC power. The construction and operation of the inverter driver circuit 288 is similar to the inverter circuit 200 shown in FIG. 7A. Each of the transistor switches contained within the inverter 288 are provided with control pins configured to receive control signals from inverter control circuitry (such as the AC motor control circuitry 214 shown in FIG. 7A). The three-phase output of the inverter circuit 288 is provided by output pins U, V, and W. The output pins U, V, W thus constitute a connection for connecting the control module to a load (for example, a three-phase induction motor) for delivering output power to the load.

Figure 8B:
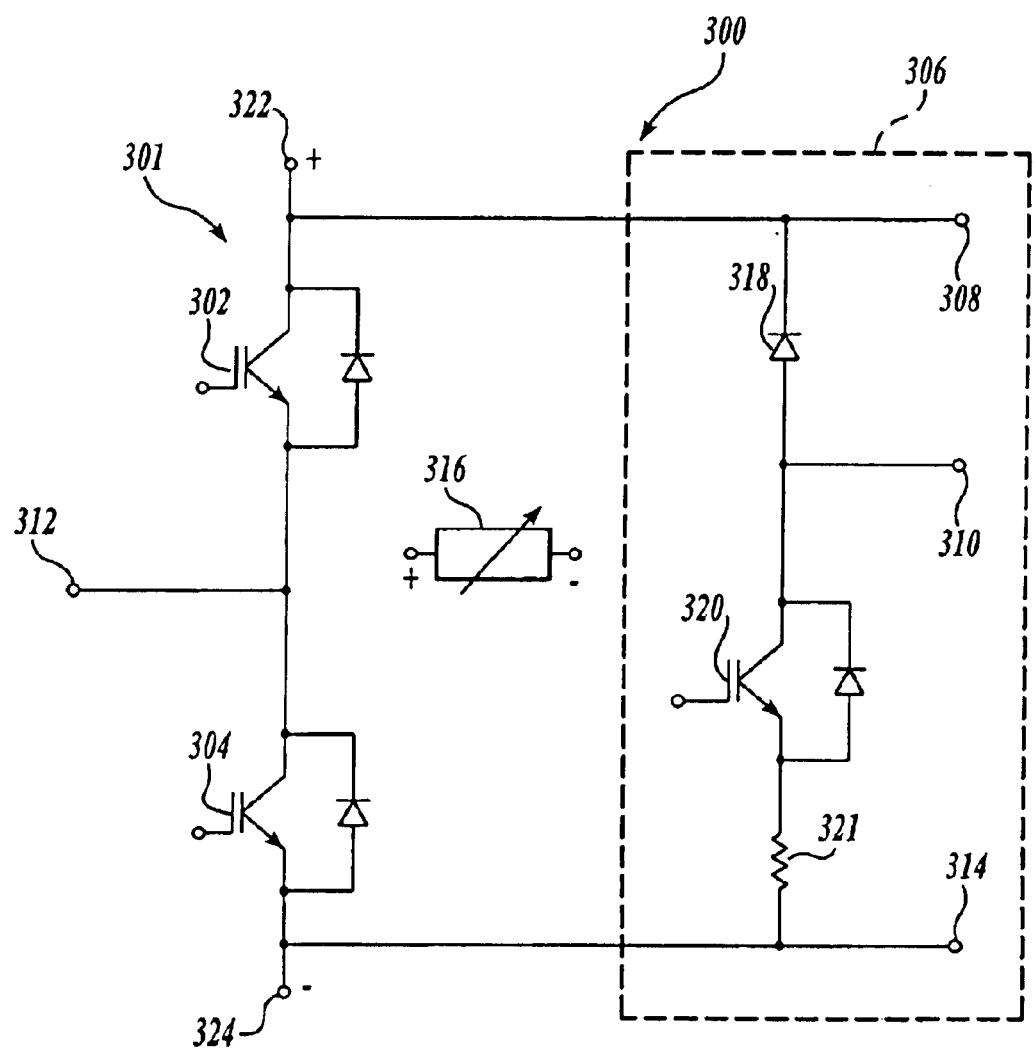
FIG. 8B is a diagram of another combined power supply and driver control module constructed in accordance with the present invention.

FIG. 8B illustrates yet another embodiment of an integrated module that includes both power supply and driver control circuitry in accordance with the present invention. The power supply and driver control module 300 shown in FIG. 8B includes circuitry 301 that both rectifies the input voltage of input power source and provides power factor correction in a manner similar to the circuit 120 shown in FIG. 4B. In this implementation, the combined rectifier and switching circuitry 301 includes two transistors 302 and 304 connected in series, the transistor switches being operable to open and close according to control signals received from control circuitry (not shown). For example, the switches 302 and 304 may be controlled by control signals received from a modulator implemented in a digital signal processor as shown in FIG. 4B.

The control module 300 further includes a driver circuit 306, here shown as a DC motor driver in a "chopper" configuration similar to the driver circuitry 222 shown in FIG. 7B. Output pins 308 and 310 provide a connection for connecting a DC motor (not shown) to the control module 300.

Pins 312, 314, and 322 in FIG. 8B are provided for connecting an input power source (not shown) to the control module 300. In particular, a power source and inductor may be connected in series to pin 312 in a manner similar to the power source 122 and inductor 124 in FIG. 4B. The other side of the power source may be connected to the midpoint of a two-capacitor arrangement spanning between pin 322 (positive DC pin) and pin 314 (connected to negative DC pin 324), in a manner similar to the arrangement of capacitors 144 and 146 shown in FIG. 4B.

The DC motor driver 306 includes a diode 318 connected in series with a transistor switch 320, similar to the diode 224 and transistor 226 shown in FIG. 7B. FIG. 8B further depicts an optional resistor 321 that may be connected in series between the transistor switch 320 and the negative DC connection 324 (or ground, as the case may be).

Lastly, the control module 300 is shown to include an optional temperature sensing device 316 connected to the module 300. As with FIG. 8A, the temperature sensing device 316 shown in FIG. 8B is a thermistor with positive and negative outputs that can be connected to control circuitry (not shown). The control circuitry preferably powers down the control module 300 should the temperature of the module exceed a determined limit.

Figure 8C:
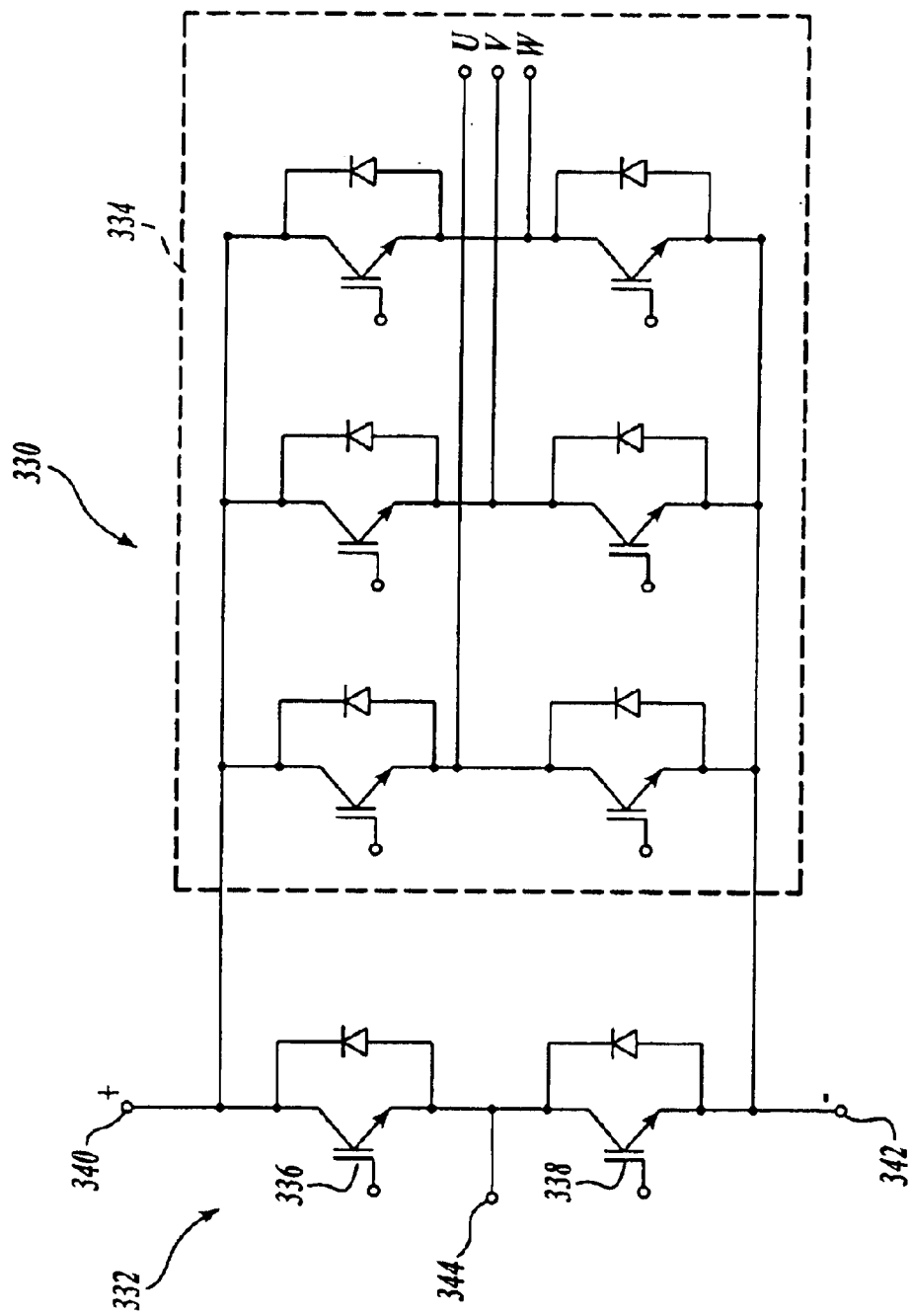
FIG. 8C is a diagram of yet another combined power supply and driver control module constructed in accordance with the present invention.

The driver circuits 288 and 306 shown in FIGS. 8A and 8B are interchangeable, as illustrated in FIG. 8C. In FIG. 8C, a power supply and driver control module 330 includes circuitry 332 that both rectifies the voltage of the input power source and provides power factor correction in a manner similar to the circuit 120 shown in FIG. 4B. The combined rectifier circuit and switching circuitry 332 includes two transistors 336 and 338 connected in series between a positive DC power pin 340 and negative DC power pin 342. The switches 336 and 338 may be controlled by control signals received from a modulator 152 as shown in FIG. 4B.

The driver circuit 334 in the control module 330 is an inverter that provides an output AC power, here specifically a three-phase AC power, though alternative circuits may provide a different form of AC power. The inverter driver circuit 334 may be constructed and operated similar to the driver circuit 200 shown in FIG. 7A. Control pins are connected to each of the transistor switches in the driver circuit 334 for delivering control signals from an AC motor control circuit (such as the AC motor control circuit 214 shown in FIG. 7A). Output pins U, V, and W provide a connection for connecting the control module 330 to an AC load, such as an AC motor.

An input power source (not shown) may be connected to the control module 330 using pins 340, 344 and 342. In particular, a power source and inductor may be connected in series to pin 344 in a manner similar to the power source 122 and inductor 124 in FIG. 4B. The other side of the power source may be connected to the midpoint of a two-capacitor arrangement spanning between the positive DC pin 340 and negative DC pin 342, in a manner similar to the arrangement of capacitors 144 and 146 shown in FIG. 4B. Note that the control module 330 is not shown with the temperature sensing device illustrated in FIGS. 8A and 8B, but such device may be included in the module 330 if desired.

It should further be noted that a switched reluctance driver circuit 232 as shown in FIG. 7C for driving a switched reluctance motor may be substituted for the inverter 288 shown in FIG. 8A and/or the DC motor driver 306 shown in FIG. 8B.

This aspect of the present invention thus provides an integrated module that includes both power factor correction (PFC) and driver circuitry, preferably in a single module. In contrast to prior art fitness equipment where separate PFC and motor driver circuits are used, resulting in larger, more spread out configurations that require additional cooling devices, the module of the present invention provides a more compact form factor and reduces the overall cost of the system. For example, one proposed implementation of the circuit shown in FIG. 8A is contained within a module that is 52 mm by 59 mm in dimension. Furthermore, the module of the invention provides improved system performance in that it is easier to cool, its assembly is less complex, it is subject to less electrical noise because of less wiring in the system, and provides better isolation for the load. The prior art particularly has not provided an integrated power factor correction and motor driver for small to medium power applications, such as typical exercise and fitness equipment for which the present invention is particularly suited. Small to medium power applications in this context are generally considered to be 5 KW or less.

The smaller form factor and improved cooling that the module of the present invention achieves is particularly significant since using reduced-size cooling apparatus, such as heat sinks and fans, reduces the overall cost and size of the system. One type of heat sink and fan that is particularly suited for use in the present invention is described in the patent document HEATSINK FOR COOLING POWER COMPONENTS, U.S. patent application Ser. No. 10/187,080, filed Jun. 28, 2002, assigned to the assignee of the present invention and incorporated by reference herein. In one embodiment, the heat sink disclosed in said application includes a base plate that contacts the module of the present invention. The heat sink further includes a plurality of fins projecting in a circular array from the other side of the base plate. A fan is positioned within the circle of fins to blow cooling air thereover. The fan, as described, is preferably powered by a source independent of the power provided by the module of the present invention. The heat sink and fan are thus able to efficiently transfer heat from the heat-generating electronic components in the module of the invention.

While the power factor correction circuitry in the circuits 170, 220, and 230 illustrated in FIGS. 7A, 7B, and 7C are shown controlled by a digital signal processor 184, it should further be noted that this aspect of the invention (i.e., an integrated PFC and driver circuit) may also be implemented using conventional prior art PFC circuitry, such as the circuitry shown in FIG. 3. The active PFC components shown in the lower portion of FIG. 3 may be substituted for the DSP 184 and the ZCD 188 shown in FIGS. 7A, 7B and 7C. It is nevertheless preferred that the power factor correction in the circuits 170, 220, and 230, or the circuits 80 and 120 in FIGS. 4A and 4B, be controlled by a digital processor, whether in a digital signal processor with software instructions stored in an integrated memory, a microcontroller with software instructions stored in a separate memory, or the like.

Figure 9:
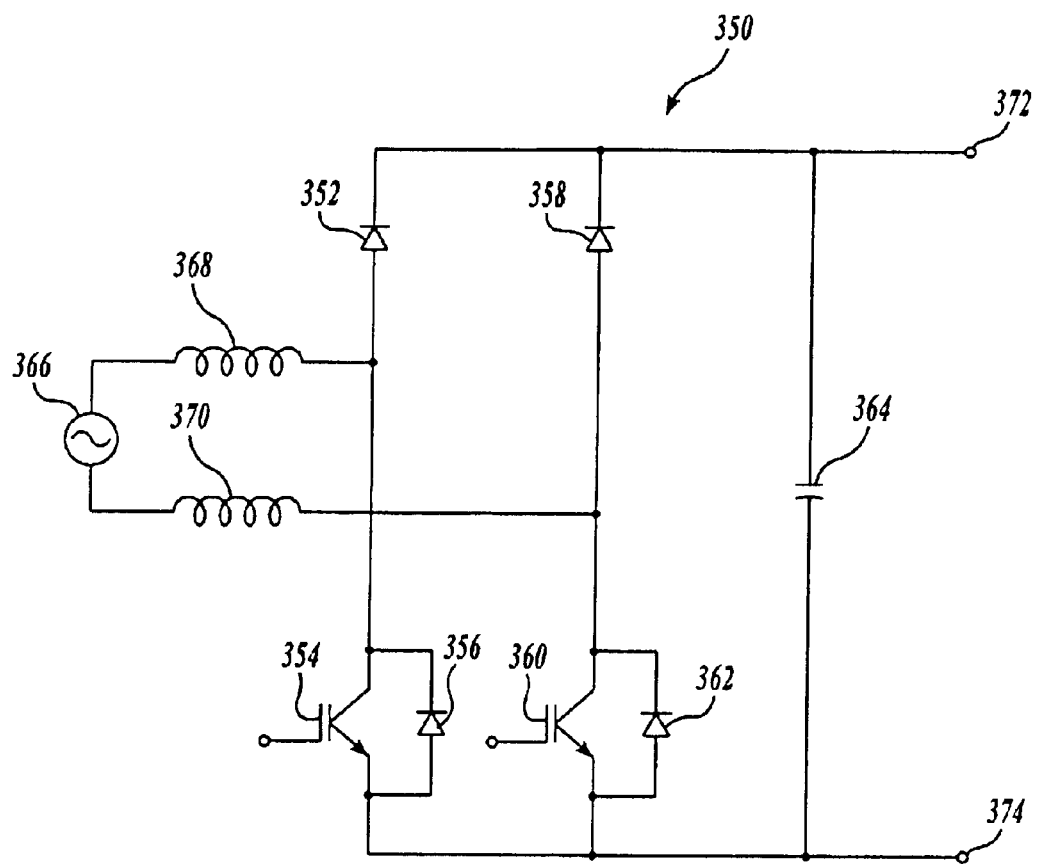
FIG. 9 is a diagram of another circuit with combined rectifier and current modulating circuitry constructed in accordance with the present invention.

Various embodiments of the invention have been shown and described. Nevertheless, it will be appreciated that various changes and modifications to the circuits disclosed herein are within the scope and spirit of the present invention. For example, FIG. 9 illustrates another possible configuration for a combined rectifier and switching circuit that may be used in accordance with the invention. In contrast to the series-connected transistors of the combined rectifier and switching circuit in FIG. 4B, the circuit 350 in FIG. 9 includes transistor switches in parallel. More specifically, one leg of the circuit 350, spanning from a positive end to a negative end of the circuit 350, includes a diode 352 connected in series with a transistor 354. The transistor 354 is connected to the anode of the diode 352 and further has an anti-parallel diode 356. A second, parallel leg of the circuit 350 includes a diode 358 connected in series with a transistor 360. The transistor 360 is connected to the anode of the diode 358 and further has an anti-parallel diode 362. A third, parallel leg of the circuit 350 includes a capacitor 364.

Connected to the first two legs of the circuit 350 is an input power source 366. More specifically, one line from the power source 366 is connected to an inductor 368 which is connected to the first leg between the diode 352 and the transistor 354. The other line from the power source 366 is connected to an inductor 370 which is connected to the second leg between the diode 358 and the transistor 360. Other suitable configurations of the circuit 350 may include only one inductor on either line from the power source 366.

During the positive half cycle of the power source 366, when the transistor 354 is "closed" (i.e., conducting) and the transistor 360 remains "open" (i.e., nonconducting), current flows from the power source 366 through the inductor 368, the transistor 354, the diode 362, the inductor 370, and back to the power source. When the transistor 354 is opened during the same positive half cycle, current flows from the power source 366 through the inductor 368, the diode 352, the capacitor 364, the diode 362, the inductor 370, and back to the power source.

During the negative half cycle of the power source 366, when the transistor 360 is closed and the transistor 354 remains open, current flows from the power source 366 through the inductor 370, the transistor 360, the diode 356, the inductor 368, and back to the power source. When the transistor 360 is opened during the same positive half cycle, current flows from the power source 366 through the inductor 370, the diode 358, the capacitor 364, the diode 356, the inductor 368, and back to the power source.

One advantage of the circuit 350 in FIG. 9, as well as the circuitry 301 in FIG. 8B and circuitry 332 in FIG. 8C, is its simplicity which often translates to a lower cost to manufacture. The circuit provides both rectification of the input voltage and modulation of the input current for power factor correction. The transistors 354 and 360 in FIG. 9 are each provided with a connection for receiving a control signal that controls the opening and closing of the transistors. Control signals may be received from a modulator, such as the modulator 152 shown in FIG. 4B. A circuit output 372 is connected to the positive end of the circuit 350, while another circuit output 374 is connected to the negative end. The terminals of a load or a circuit like driver circuit 288 in FIG. 8A and driver circuit 306 in FIG. 8B may be connected to the outputs 372 and 374 to operate loads such as an AC or a DC motor.

As with the transistor switches 126 and 128 in FIG. 4B, the transistor switches 354 and 360 are typically opened and closed at a frequency that is much higher than the line frequency of the input power source 366. Algorithms known in the art of power factor correction may be used to calculate the time during which the transistors 354 and 360 are closed so as to modulate the input current waveform and bring it closer in phase with the input voltage waveform, thereby improving the power factor of the circuit. The algorithm selected may depend on whether the circuit 350 is to be operated in a continuous conduction mode, a critical conduction mode, or a discontinuous conduction mode. Furthermore, it should be noted that the combined rectifier and switching circuitry in the circuit 350 may be used in conjunction with the circuits 288 (FIG. 8A), 306 (FIG. 8B), and 232 (FIG. 7C).

The lookup table 110, 154, and 190 are described herein as containing sine values. This is based on a preferred implementation in which the input voltage is sinusoidal and the input current is being modulated to match the phase of the sinusoidal. Other embodiments of the invention may have other values stored in the lookup table that describe different waveforms for modulating the input current to match the phase and frequency of the input voltage. Furthermore, the transistor switches depicted in the drawings herein may be IGBTs, MOSFETs, bipolar transistors, or any other kind of active switching device.

It should also be noted that in this patent document, the word "comprising" is used in its non-limiting sense to mean that items following the word are included, but items not specifically mentioned are not excluded. Reference to an element by the indefinite article "a" does not exclude the possibility that more than one of the element is present. Reference to an electrical component being "connected" to another electrical component may indicate a direct electrical connection or indirect electrical communication between the components.

With the foregoing in mind, the scope of the invention should be determined in reference to the following claims and equivalents thereto.

The embodiments of the invention in which an exclusive property or privilege is claimed are defined as follows:

1. A combined power supply and driver control module, comprising:
   (a) a first connection for connecting the control module to an input power source;
   (b) a rectifier circuit connected to the first connection for rectifying input voltage received from the input power source and providing a rectified output for producing a DC power;
   (c) a switching device configured to receive the DC power and modulate input current received from the input power source;
   (d) control circuitry for controlling the opening and closing of the switching device to modulate the input current received from the power source, the input current received from the power source being modulated by the switching device to be closer in phase with the voltage of the power source;
   (e) a driver circuit connected to the switching device for providing an output power to a load; and
   (f) a second connection for connecting the control module to the load.

2. The control module of claim 1, wherein the switching device includes a transistor in series connection with a diode, the transistor being operable to modulate the current received from the power source.

3. The control module of claim 1, wherein the rectifier circuit and the switching device are combined and comprise two or more transistors, the transistors being operable to separately open and close and thereby rectify the voltage and modulate the current received from the power source.

4. The control module of claim 1, wherein the driver circuit is a motor driver and the load to which the module can be connected is a motor.

5. The control module of claim 4, wherein the driver circuit is a DC motor driver and the load to which the control module can be connected is a DC motor.

6. The control module of claim 4, wherein the driver circuit is a switched reluctance driver and the load to which the control module can be connected is a switched reluctance motor.

7. The control module of claim 1, wherein the driver circuit is an inverter that provides an output AC power.

8. The control module of claim 7, wherein the load to which the module can be connected is an AC motor.

9. The control module of claim 1, further comprising a temperature sensing device that senses the temperature of the control module and provides a corresponding output signal.

10. The control module of claim 9, wherein the temperature sensing device is a thermistor.

11. The control module of claim 1, further comprising an energy storage element connected to the DC power received by the switching device.

12. The control module of claim 11, wherein the energy storage element is an inductor.

13. The control module of claim 11, wherein the energy storage element is a capacitor.

14. The control module of claim 1, wherein the control circuitry is comprised of a digital processor that operates in accordance with instructions stored in a memory, the digital processor having a signal output connected to the switching device for controlling the opening and closing of the switching device.

15. The control module of claim 1, further comprising a single heat sink connected to the module and configured to provide cooling for the entire module.

16. The control module of claim 15, further comprising a fan operable in connection with the heat sink to improve the transfer of heat from the control module.

17. A power factor correction circuit, comprising:
(a) an input connection for connecting the power factor correction circuit to an input power source;
(b) rectifier circuitry connected to the input connection for rectifying input voltage received from the input power source and providing a rectified output for producing a DC power;
(c) switching circuitry configured to receive the DC power and conduct input current from the input power source when the switching circuitry is closed; and
(d) a digital processor connected to the switching circuitry for controlling the opening and closing of the switching circuitry in accordance with instructions stored in a lookup table in a memory to modulate the input current received from the input power source, the lookup table containing values that collectively represent a current waveform, wherein the digital processor is configured to read values from the lookup table and modulate the input current received from the input power source based on the values read from the table.

18. The power factor correction circuitry of claim 17, further comprising an energy storage element connected to the DC power received by the switching circuitry.

19. The power factor correction circuit of claim 18, wherein the energy storage element is an inductor.

20. The power factor correction circuit of claim 18, wherein the energy storage element is a capacitor.

21. The power factor correction circuit of claim 17, wherein the switching circuitry includes a transistor connected in series with a diode, the transistor being operable to modulate the input current received from the power source.

22. The power factor correction circuit of claim 17, wherein the rectifier circuitry and the switching circuitry are combined and comprise two or more transistors, the transistors being operable to separately open and close and thereby rectify the voltage and modulate the current received from the power source.

23. The power factor correction circuit of claim 17, wherein the digital processor is a digital signal processor (DSP) having an integrated memory.

24. The power factor correction circuit of claim 17, wherein the values in the lookup table represent a sinusoidal waveform.

25. The power factor correction circuit of claim 17, wherein the values in the lookup table represent a waveform sampled at uniform intervals.

26. The power factor correction circuit of claim 17, wherein the resolution of the waveform represented by the values in the lookup table is increased by increasing the number of values stored in the lookup table.

27. The power factor correction circuit of claim 17, further comprising a zero crossing detector connected to the input power source, wherein the zero crossing detector is configured to deliver a signal to the digital processor when the input voltage of the power source crosses a zero potential.

28. The power factor correction circuit of claim 27, wherein the digital processor is configured to commence reading values from the lookup table each time a signal from the zero crossing detector is received.

29. A method of power factor correction in a circuit, comprising:
(a) providing a switch that is configured to open and close, the switch conducting input current from an input power source when the switch is closed;
(b) sensing the voltage of the input power source;
(c) reading stored values from a memory, wherein the values collectively represent a current waveform; and
(d) modulating the opening and closing of the switch based on the values read from the memory to modulate the input current received from the input power source to be closer in phase with the voltage of the input power source.

30. The method of claim 29, further comprising sensing an electrical parameter of the input power source for an event and commencing to read the values from the memory based on the occurrence of the event.

31. The method of claim 30, wherein the event is the voltage of the input power source crossing a zero potential.

32. The method of claim 30, further comprising adjusting the rate at which the values are read from the memory based on the occurrence of the event.

33. The method of claim 29, wherein the values are stored in a lookup table in the memory.

34. The method of claim 29, wherein the values represent a sinusoidal current waveform.

35. The method of claim 29, wherein the values represent a current waveform sampled at uniform intervals.

36. The method of claim 29, wherein the resolution of the current waveform stored in the memory is increased by increasing the number of values stored in the memory.

37. An article comprising a storage medium, the storage medium having instructions stored thereon in which, when the instructions are executed by a device, they cause the device to:

(a) read stored values from a memory, wherein the values in the memory collectively represent a current waveform;

(b) sensing the voltage of the input power source;

(c) modulate the opening and closing of a switch that conducts current from an input power source when the switch is closed, wherein modulation of the switch is based on the values read from the memory and causes the switch to modulate the input current received from the input power source to be closer in phase with the input power source.

38. The article of claim 37, in which executing the instructions further causes the device to:

(a) sense an electrical parameter of the input power source for an event; and (b) commence reading the values from the memory based on the occurrence of the event.

39. The article of claim 38, wherein the event is the voltage of the input power source crossing a zero potential.

40. The method of claim 38, in which executing the instructions further causes the device to adjust the rate at which the values are read from the memory based on the occurrence of the event.

* * * * *